(12) United States Patent
Aryan

(10) Patent No.: US 11,138,262 B2
(45) Date of Patent: Oct. 5, 2021

(54) CONTEXT-AWARE MUSIC RECOMMENDATION METHODS AND SYSTEMS

(71) Applicant: Melodia, Inc., Palo Alto, CA (US)

(72) Inventor: Omid Aryan, Palo Alto, CA (US)

(73) Assignee: MELODIA, INC., Palo Alto, CA (US)

( * ) Notice: Subject to any disclaimer, the term of this patent is extended or adjusted under 35 U.S.C. 154(b) by 396 days.

(21) Appl. No.: 15/711,656

(22) Filed: Sep. 21, 2017

(65) Prior Publication Data

US 2018/0081968 A1 Mar. 22, 2018

Related U.S. Application Data

(60) Provisional application No. 62/397,824, filed on Sep. 21, 2016.

(51) Int. Cl.
*G06F 16/00* (2019.01)
*G06F 16/64* (2019.01)
*G06N 7/00* (2006.01)
*G06N 20/00* (2019.01)
*G06F 16/638* (2019.01)

(52) U.S. Cl.
CPC ............ *G06F 16/64* (2019.01); *G06F 16/638* (2019.01); *G06N 7/005* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,620,662 B2 | 12/2013 | Bellegarda et al. | |
| 9,355,174 B2* | 5/2016 | Moss | G06F 16/24578 |
| 9,510,050 B2 | 11/2016 | Mukherjee et al. | |
| 9,691,391 B2* | 6/2017 | Gateau | G10L 17/00 |
| 10,248,850 B2* | 4/2019 | Rihn | G06F 3/011 |
| 10,318,651 B2* | 6/2019 | Moss | G06F 16/639 |
| 2003/0135582 A1 | 7/2003 | Allen et al. | |
| 2012/0054178 A1 | 3/2012 | Tran et al. | |
| 2013/0017519 A1* | 1/2013 | Leshed | G09B 19/00 434/238 |
| 2013/0194066 A1* | 8/2013 | Rahman | H04M 1/72454 340/5.51 |
| 2013/0282808 A1* | 10/2013 | Sadanandan | G06Q 10/10 709/204 |
| 2015/0120648 A1 | 4/2015 | Slovacek | |
| 2015/0264439 A1 | 9/2015 | Karlin et al. | |
| 2018/0004735 A1* | 1/2018 | Singh | G06F 16/435 |

* cited by examiner

*Primary Examiner* — Debbie M Le
(74) *Attorney, Agent, or Firm* — Wilson Sonsini Goodrich & Rosati

(57) ABSTRACT

A method and system for a real-time and context-aware music recommendation system is disclosed. A plurality of data samples generated from an application in a user device of a user for a plurality of audio files are received. One or more probability distributions over the plurality of audio files are computed based on one or more pre-defined criteria. The one or more pre-defined criteria based on the plurality of data samples. A ranking of the plurality of audio files is determined from the one or more probability distributions over audio files. One or more audio files from the ranking of the plurality of audio files to the user through a User Interface (UI) of the user device in the application are recommended.

20 Claims, 12 Drawing Sheets

CONTEXT-AWARE MUSIC RECOMMENDATION METHODS AND SYSTEMS

TECHNICAL FIELD

The present disclosure relates to techniques for making context-aware music recommendation to users.

BACKGROUND

Digital audio files (hereinafter alternatively referred to as songs) are consumed by the users by way of a wide variety of applications. For example, through networks (e.g., the Internet), users are now able to utilize multiple features provided by applications such as selecting a desired song based on its genre, artist, tempo, mood, pitch, etc. Moreover, the users are also able to listen to songs on a variety of devices, such as cellular telephones and MP3 players. The Internet is also a useful medium for the distribution of music in other forms, such as through Internet radio providing various radio stations.

Many music recommendation mobile and non-mobile applications have been developed over the years that recommend music to the user based on the user's taste and preference for music. These applications employ a plethora of features such as the music's genre, artist, tempo, mood, pitch, etc., as well features relating to the user (such as his age, origin, etc.) to determine the types of songs to recommend to a particular user.

A method commonly employed by these recommendation systems to recommend a stream of music to a user, called a "station" or a "radio station", works as follows: a seed song is requested from the user to create the station. The system then recommends songs that are similar to this seed song in some respect (such as the genre, artist, tempo, year, etc.) and fine-tunes the music recommended in the stream by taking the user's input on each song played (i.e., did the user like or dislike the song). Thus, the user can then choose a station whose seed song matches the mood of the user and the system recommends music similar to the seed song.

In another method, the system categorizes the songs in a database into different moods/feels. The user will then choose a category that the user thinks matches closely to the user's feeling or desires, and the system plays the songs in that category in some given fashion. Note that there are a limited number of categories for the user to choose from, and the same songs in each category are recommended to any user that chooses a particular category.

With all the aforementioned methods, for a system to recommend/play a song for the user at any given time, a manual input is required from the user, whether it is the seed song for a station or a category of mood the user is feeling.

However, such recommendations of songs do not capture the many complex factors underlying the relationship between the user's past music listening patterns with the respective contextual information at the time of listening. Such contextual information may include factors such as the time and date of the request, the weather conditions, the user's location and speed, as well as physiological factors such as the user's heart-rate, body temperature, blood pressure, EDA level, and so forth. One can also consider the recent songs the user has listened to as indications for the user's context. Nonetheless, computationally, current applications do not include all the variables to model the user behavior and the contextual characteristics for making predictions that closely match the user's real-time interest and craving for music.

SUMMARY

Various embodiments of the present disclosure provide methods for a context-aware and real-time music recommendation system.

In an embodiment, a method includes receiving, by a processing system, a plurality of data samples generated from an application in a user device of a user for a plurality of audio files. The method further includes computing, by the processing system, one or more probability distributions over the plurality of audio files based on one or more pre-defined criteria. The one or more pre-defined criteria are based on the plurality of data samples. The method further includes determining, by the processing system, a ranking of the plurality of audio files based on the one or more probability distributions over the plurality of audio files. Thereafter, the method includes recommending, by the processing system, one or more audio files from the ranking of the plurality of audio files to the user through a User Interface (UI) of the user device in the application.

In another embodiment, a processing system includes at least one processor, a communication interface controlled by at least one processor to communicate with a user device of a user and a memory. The memory having stored therein machine executable instructions, that when executed by the at least one processor, cause the processing system to receive a plurality of data samples generated from an application in the user device for a plurality of audio files. The processing system is further caused to compute one or more probability distributions over the plurality of audio files based on one or more pre-defined criteria. The one or more pre-defined criteria are based on the plurality of data samples. The processing system is further caused to determine a ranking of the plurality of audio files based on the one or more probability distributions over the plurality of audio files, and to recommend one or more audio files from the ranking of the plurality of audio files to the user through a User Interface (UI) of the user device in the application.

BRIEF DESCRIPTION OF THE FIGURES

For a more complete understanding of example embodiments of the present technology, reference is now made to the following descriptions taken in connection with the accompanying drawings in which.

Figure 1:
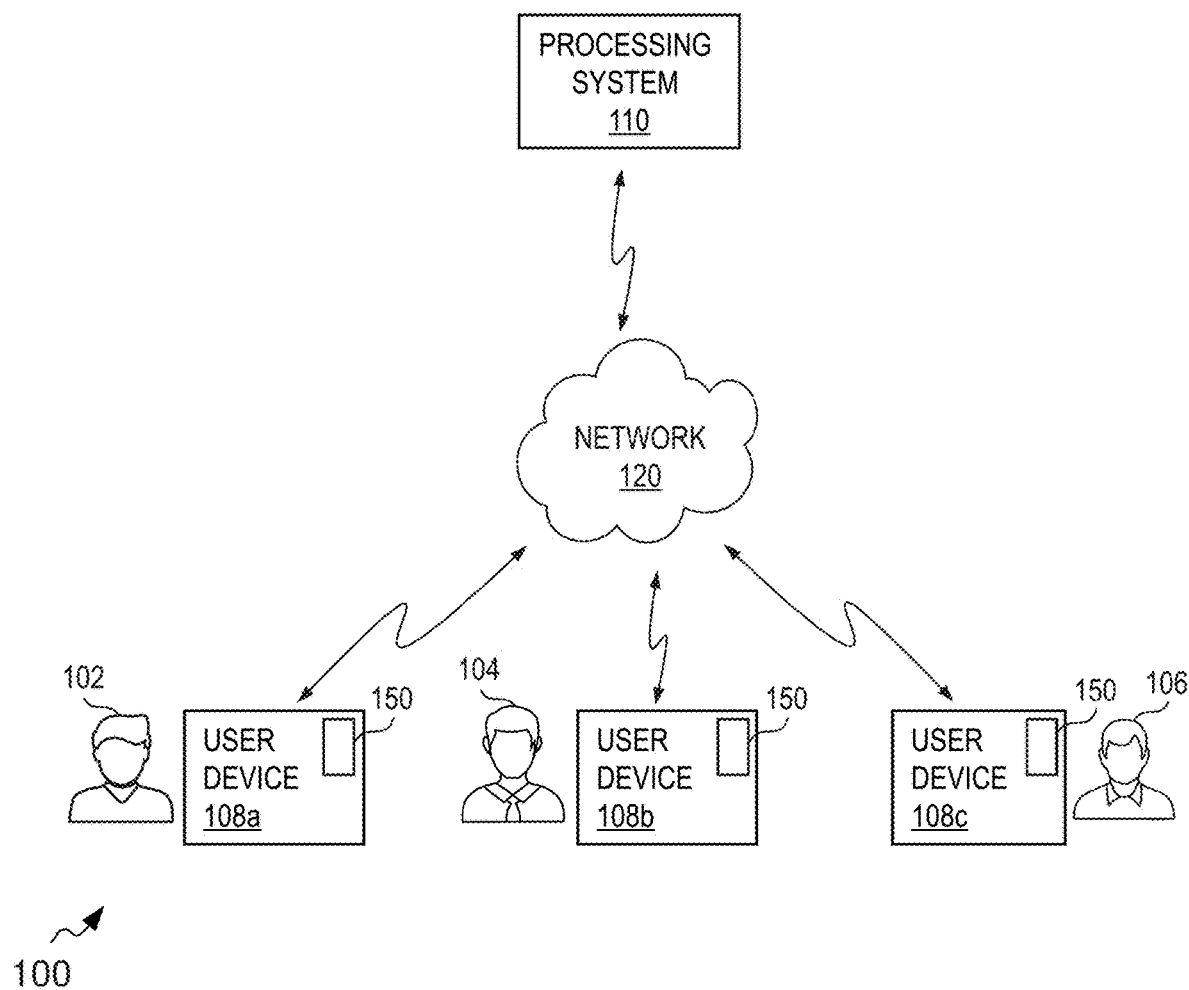
FIG. 1 illustrates an example environment related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments disclosed herein provide methods and systems for a context-aware and real-time music recommendation application. A user device may have an application installed thereon in which song recommendations can be visible and the recommended songs can be played back through a User Interface (UI) of the user device. Various embodiments includes a processor system (hereinafter referred to as 'system') for making the context-aware and real-time music recommendations, wherein the system is communicably coupled to the user device. The system may be an external server system or may even be embodied within the user device if the user device has significant computing capabilities. The application facilitates a collection of a plurality of data samples from the user for a plurality of audio files. The data samples include the user's current contextual features and the user's past music listening patterns. The system is configured to compute a ranking of the plurality of audio files based on one or more probability distributions over the plurality of audio files. A brief explanation of the probability distributions is provided herein below, and is described in detail with respect to corresponding Figures.

In some embodiments of computation of probability distribution, the system is configured to determine a set of overlapping communities in a set of audio files based on the relationships among the audio files. The system is further configured to determine a community vector for each audio file. A prediction of the desired audio file belonging to each community is determined by computing a prediction vector using one of two methods: context-based and session-based, which are described later. A closeness measure is then computed for each audio file's community vector and the computed prediction vector in order to form the probability distribution over all the audio files.

Another probability distribution may be computed based on one or more general factors that describe how the user has interacted with each audio file that allows to directly create a probability distribution over the plurality of audio files. Such general factors may include, but not limited to, the last timestamp at which the song was played to the user, the number of times the song has been played to the user, the number of times the user has liked listening to a particular song, the number of times the user as disliked listening to a particular song. A probability distribution over the plurality of audio files is then computed using the value of such one or more general factors.

Another probability distribution may be computed based on the order in which the audio files have been played. For example, a successive score for each audio file is determined to measure successiveness to the song/audio file listened to at the previous/preceding time step. Further, an updated path score is computed for each audio file based on the succession score. Thereafter, a probability distribution of the audio files is computed by the system based on their respective path scores.

Ultimately, the plurality of audio files are ranked based on the various probability distributions computed for the plurality of audio files. Thereafter, one or more audio files from the ranking of the plurality of audio files are recommended by the system to the user through the UI of the user device in the application.

Various embodiments of the disclosure for implementing a real-time music recommendation system are explained in detail herein with reference to FIGS. 1 to 12.

Environment Diagram

FIG. 1 illustrates an example environment 100 related to at least some embodiments of the present invention. As such, it should be noted that at least some of the components described below in connection with the environment 100 may be optional and thus in some example embodiments may include more, less or different components than those described in connection with the example embodiment of FIG. 1 or with subsequent FIGS. 2 to 12.

In the illustrated example representation, the environment 100 depicts a plurality of users such as users 102, 104 and 106 with their respective user devices such as 108*a*, 108*b* and 108*c* respectively. In various embodiments, the user devices 108*a-c* may be a mobile phone, a computer, a tablet, a virtual reality headset, electronic glasses, or any other multimedia device having UI such as display. The environment 100 is further shown depicting a communication network such as a network 120 that connects the user devices 108*a-c* to at least one processing system such as the processing system 110. In an example embodiment, the processing system 110 may be a single composite server, or it may have multiple sub-systems. The network 120 may be a centralized network or may include a plurality of sub-networks that may offer a direct or indirect communication between the processing system 110 and the user devices 108*a-c*. For example, the network 120 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or ZigBee networks, and the like. An example of the combination of wired and wireless networks may include the Internet.

The system 110 may correspond to a Web-based platform (for example, a cloud platform) capable of being accessed over the network 120. The Web-based platform may provision a Music Recommendation application 150 (hereinafter referred to as MR application 150 or simply application 150) service as a Web service accessible through a Website. In such a scenario, a plurality of users (such as the users 102, 104 and 106) may access the Website over the network 120 using Web browser applications installed in their respective computing devices and thereafter use the services of the application 150.

In at least one example embodiment, the system 110 may also be configured to store an MR application program and provision instances of the application 150 to end-users (such as the users 102, 104 and 106) for facilitating song recommendation based on their respective and real time contextual information. The users/end-users may request the system 110 to access to the MR application 150 over the network 120 using their respective computing devices. The instances of the application 150 may thereafter be downloaded on respective user devices of the end-users in response to their request for accessing the application 150. Alternatively, in some embodiments, the application 150 may be factory installed within the computing devices (such as the computing devices 108*a-c*) associated with the end-users and, as such, the users may not need to explicitly request the application 150 from the system 110 as exemplarily shown in FIG. 1.

In an example embodiment, based on the requirements of the underlying device platform or operating system being used by the users, multiple MR applications may be developed using different technologies. For example, the MR application 150 may be implemented using a markup language such as HTML and related technologies displayed inside a web-browser technology such as Safari®, Firefox® or Internet Explorer®. In yet another embodiment, the MR application 150 may be a stand-alone application designed to be downloaded and run on a specific device such as a tablet running the Apple iOS operating system, Android operating system, or others. The stand-alone applications may be created using a set of application programming interfaces (APIs) and libraries.

In one embodiment, a user (e.g., the user 102/the user 104/the user 106) upon accessing the Website and/or the MR application 150 associated with the system 110 may optionally be presented with one or more UIs displayed (not shown) on a display screen of the user device to send a profile creation request to the system 110 so as to utilize various features of the application upon registration/creation of the profile. The user may be prompted to provide personal information using the UI, such as his or her name, age (e.g., birth date), gender, interests, contact information, location, occupation, favorite activities, relationship status and the like. This information is stored, for example, as a form of data samples in a database associated with the system 110 with a reference number to identify the user. In one example embodiment, these data samples related to the user's personal information may be used by the system 110 for music recommendation to the user. A registered user is hereinafter alternatively referred to as a user having his/her profile created in the system 110.

In at least one example embodiment, the MR application 150 installed on the device of the user may be configured to utilize a plurality of sensing modules associated with the application 150 to collect real time information of the user to determine a plurality of contextual features associated with the user. Some non-exhaustive examples of the sensing modules include an accelerometer, a gyroscope, a magnetometer, a camera, a microphone, a GPS (Global Positioning System) receiver, a light sensor, an altitude sensor, a proximity sensor, a compass, a blood pressure monitor, a heart rate monitor, a body temperature sensor, a papillary response detector, a haemoglobin saturation monitor, a skin conductivity monitor, a respiration rate monitor, a brainwave activity inspector and the like.

The plurality of contextual features in form of data samples are sent to the system 110 over the network 120. Further, the system 110 receives/collects data samples from the user each time the user likes or dislikes a song that is being played or has been recommended to the user. Each data sample includes a timestamp, values associated with each contextual feature, information about the song, etc. It is noted that the term 'music' may alternatively be referred to as songs, audio files, sound files, music files and audio compositions throughout the disclosure without deviating from the scope.

In some cases, the processing system 110 may be embodied within each of the user devices 108*a-c* for making the song recommendations locally, and in such cases, there is no need of receiving recommendations over the network 120. Alternatively, songs may be recommended from both sources for example, locally as well as over the network from the external processing system 110.

Overall Method Flowchart

Figure 2:
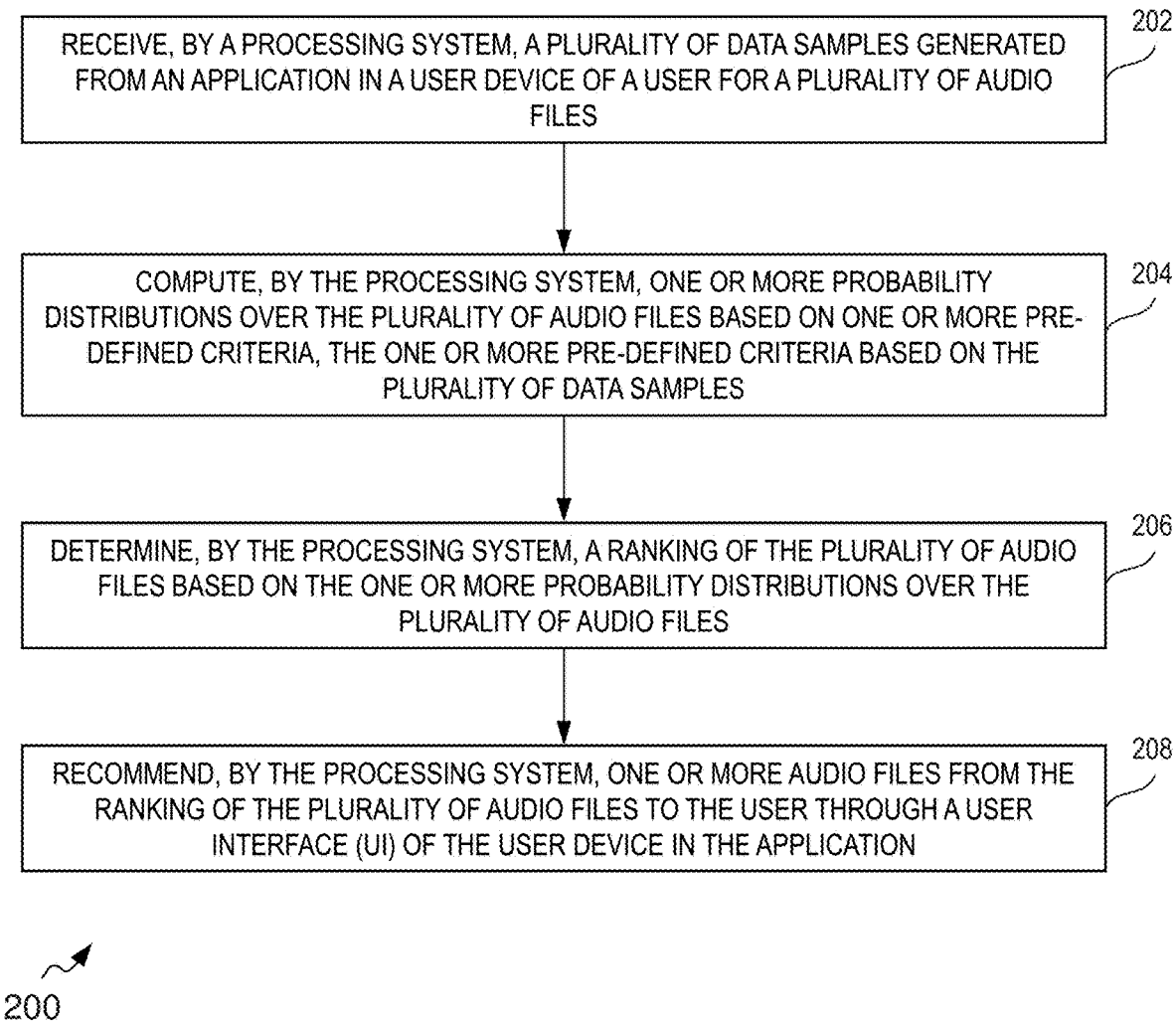
FIG. 2 illustrates a flow diagram of a method for facilitating song recommendation, in accordance with an example embodiment of the present disclosure.

FIG. 2 illustrates a flow diagram of a method 200 for context-aware and real-time music recommendation, in accordance with an example embodiment of the present disclosure. The various steps and/or operations of the flow diagram, and combinations of steps/operations in the flow diagram, may be implemented by, for example, hardware, firmware, a processor, circuitry and/or by the system 110 of FIG. 1 and by a combination of a user device associated with a user and the system 110. The steps and/or operations of the method 200 are not necessarily performed in a sequence, and they may be performed simultaneously or in a different sequence than that of shown in FIG. 2. Further, some steps and/or operations may have a plurality of sub-steps, or even some of the steps/operations may be performed together in a joint manner.

At 202, a plurality of data samples generated from an application in a user device of a user for a plurality of audio files are received by a processing system. The data samples include information of past music listening patterns of the user, information of specific feedback/user actions (including but not limited to like, dislike, tagging a song as 'favorite', sharing a song with other users, etc.) associated with songs, in addition to current contextual information associated with either the user or the songs. The past music listening patterns and the information of specific feedback/user actions may be stored in a database accessible to the system (such as the system 110 of FIG. 1) in form of data samples. The system is configured to, periodically or on real-time basis, receive the plurality of contextual features of the user such as time, date, weather conditions, user's location, motion data, physiological state of the user and the like. Some non-exhaustive examples of the physiological state of the user include heart-rate, stress level, body temperature, blood pressure, Electrodermal Activity (EDA) level and the like. It is noted that the "receipt of the data samples" at the system is an ongoing process, and new data samples are generated depending on any interaction (e.g., playback of songs, liking/disliking songs, rating of songs, tagging of songs, sharing of songs, etc.) of the user with the application or library of songs, or by any changes in the current contextual features that may be of interest for the ranking of the songs.

At 204, the method 200 includes computing one or more probability distributions (PD) over the plurality of audio files based on one or more pre-defined criteria. The one or more pre-defined criteria are based on the plurality of data samples. Each of the probability distributions may also be associated with a corresponding weight assigned to the probability distribution. In an example, a probability distribution over the plurality of audio files includes a relative (or normalized) probability value for each of the audio files. In this example, if a probability value of an audio file is more, there is a greater chances of recommendation of the audio file (song) as compared to other audio files with relatively smaller probability values. Some methods of computing the probability distributions are described later in the present description, specifically with reference to FIGS. 5A-5B, 6 and 8.

At 206, a ranking of the plurality of audio files is determined from the one or more probability distributions over the plurality of audio files. The system includes a ranking module configured to take various probability distributions over the audio files, along with an associated weight for each probability distribution as input and return a ranking of the audio files. The determined ranking is based on a weighted combination of the input probability distributions. The ranking module places more importance on the probability distributions with a greater weight when computing the ranking of the audio files.

At 208, one or more audio files from the ranking of the plurality of audio files are recommended to the user through a User Interface (UI) of the user device in the application. In one embodiment, based on the ranking, the processing system either recommends the song that is ranked first/highest, or it selects another song to add diversity and randomness to the recommendation process. In an alternate embodiment, the system may follow a set of rules for recommending songs from the ranking of the plurality of audio files, where the set of rules may even be customized by the user.

Without limiting to scope of the present disclosure, four methods of computing the probability distributions are disclosed herein. Such methods and one or more criteria used for computing these probability distributions are as follows:

1. First method (also referred to as 'first network and community method)—Probability distribution based on current contextual features and community vectors for songs (described with reference to FIGS. 3, 4 and 5A);
2. Second method (also referred to as 'second network and community method)—Probability distribution based on information of playback of recent songs and community vectors for songs (described with reference to FIGS. 3, 4 and 5B);
3. Third method—One or more probability distribution computed based on general factors (described with reference to FIGS. 6); and
4. Fourth method—Probability distribution computation based on an ordered graph obtained from analyzing a sequence of playback of songs (described with reference to FIGS. 7 and 8).

Embodiments of the present disclosure perform the first method and the second method by using a "network/graph of nodes" (each node represents an audio file (song)) and a "set of overlapping communities of nodes". Hence, an example of the "network of nodes" and an example of the "set of overlapping communities" of the audio files are described with reference to FIGS. 3 and 4. Thereafter, the first method is described with reference to FIG. 5A and the second method is described with reference to FIG. 5B.

Figure 3:
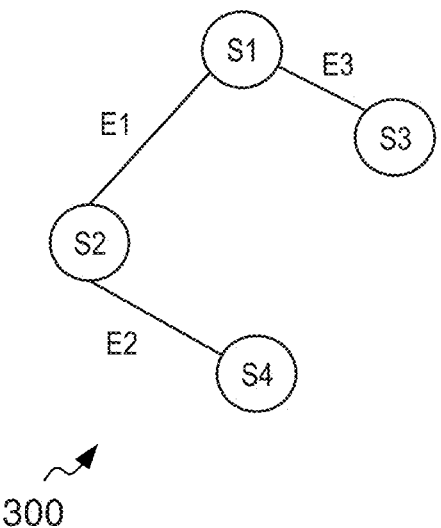
FIG. 3 shows a simplified representation of a network (undirected graph) formed using a plurality of nodes and a plurality of edges, in accordance with an example embodiment of the present disclosure.

Referring now to FIG. 3, a simplified representation of a network (undirected graph) 300 formed using a plurality of nodes and a plurality of edges, is shown, in accordance with an example embodiment of the present disclosure. It is understood that the graph 300 is a simplified illustrative representation showing a limited number of nodes and edges, and that there may be a large number of nodes and edges depending on a total number of songs present in library of the songs associated with the user. Each node represents an audio file/a song and an edge represents a similarity between a pair of audio files connected by the edge. In the illustrated simplified representation, the undirected graph 300 is formed (hereinafter alternatively referred to as graph 300/network 300) by the system 110 using a plurality of nodes such as the nodes S1, S2, S3 and S4 and a plurality of edges, each connecting a pair of nodes. For example, an edge E1 connects nodes S1 and E2, an edge E2 connects nodes S2 and S4 and an edge E3 connects nodes S1 and S3.

In at least one embodiment, the system 110 is configured to assign a weight attribute to each edge of the plurality of edges (i.e., E1, E2, E3 and E4). The value of the weight attribute, in turn, is a weighted summation of a set of similarity factors between the two nodes (i.e., two songs) being connected via the associated edge. For example, for two nodes 'n1' and 'n1' (e.g., nodes S1 and S2) with an edge 'e' (e.g., the edge 'E1') connecting the two nodes, the weight '$W_e$' of the edge 'e' is calculated using the following equation:

$$W_e = \Sigma^N_{i=1}(w\_i * f_i(n1, n2)) \quad (1)$$

In the above equation (1), 'N' corresponds to 'N' different similarity factors to be considered to calculate the similarity between any two nodes 'n1' and 'n2'. Functions '$f_i$' represents the similarity factors. Each similarity factor is also associated with a similarity factor weight '$w\_i$'. It is noted that each of the '$f_i$' functions measures a different form of similarity between the two songs 'n1' and 'n2'.

In one embodiment, the similarity factors between a pair of audio files (i.e., nodes 'n1' and 'n2') connected by the edge (i.e., 'e') are determined based on one or more 'audio features' and/or one or more 'non-audio features'. Some non-exhaustive examples of the one or more audio features include a tempo, a rhythm, a loudness, a pitch and the like associated with the connected audio files. The 'non-audio features' are determined based on factors other than the audio files' audio features. For instance, some non-exhaustive examples of the 'non-audio features' include one or more user preferences (like/dislike of a song) provided by the user for the audio files for a predetermined time interval, whether the audio files are included in the same playlist (these playlists may or may not have been defined by the user) and the like.

In one embodiment, the system 110 is configured to associate each similarity factor with its own weight '$w\_i$'. The weight associated with each similarity factor can either be a pre-determined fixed value, or the values learned through training the user's existing data samples. In some embodiments, the fixed values are used and are arbitrarily determined by the system 110. In other embodiments, the learned values are computed by the system 110 as they provide improved accuracy and personalization compared to the fixed values. The learned values are obtained by performing an optimization on the weights that leads to better defined/computed communities for computing the respective probability distribution over the audio files.

Figure 4:
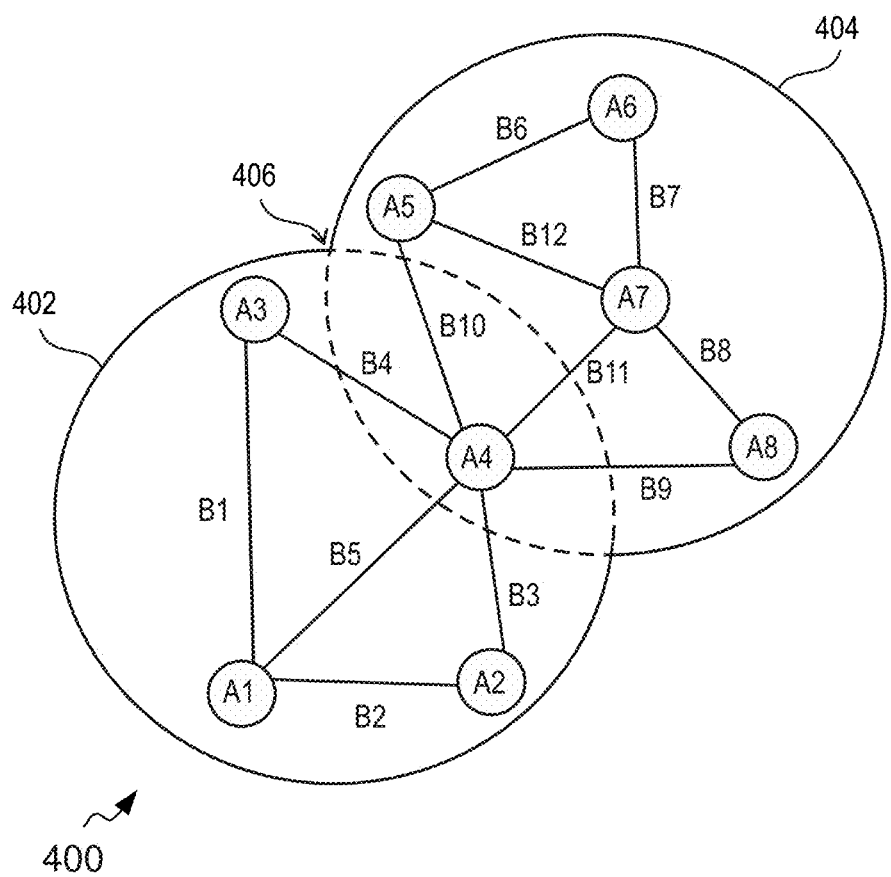
FIG. 4 shows a simplified representation of a set of overlapping communities determined for a network of plurality of nodes and edges, in accordance with an example embodiment of the present disclosure.

FIG. 4 shows a simplified representation 400 of a set of overlapping communities determined for a network of plurality of nodes and edges (such as the network 300 of FIG. 3), in accordance with an example embodiment of the present disclosure. The representation 400 is depicted to include an undirected graph including a plurality of nodes, such as the nodes A1, A2, A3, A4, A5, A6, A7 and A8, where each node represents a corresponding song. The graph also includes a plurality of edges, where each edge connects a pair of nodes. For example, Nodes A1 and A3 are connected by edge B1, nodes A1 and A2 are connected by edge B2, nodes A2 and A4 are connected by edge B3, nodes A3 and A4 are connected by edge B4, nodes A1 and A4 are connected by edge B5, nodes A5 and A6 are connected by edge B6, nodes A6 and A7 are connected by edge B7, nodes A7 and A8 are connected by edge B8, nodes A8 and A4 are connected by edge B9, nodes A4 and A5 are connected by edge B10, nodes A7 and A4 are connected by edge B11, and nodes A5 and A7 are connected by edge B12. As explained with reference to FIG. 2, the weight of each edge can be determined by the system 110 using equation (1) based on considering various similarity factors.

In at least one embodiment, the system 110 is configured to perform a community-detection algorithm on the network of the representation 400 to determine a set of overlapping communities. The system 110 can use any of the suitable community detection algorithm for determining the set of overlapping communities within the user's library of songs. Without limiting to the scope of present disclosure, in an embodiment, the system 100 uses a community overlap propagation algorithm (COPRA) for determining the overlapping communities. The community—detection algorithm, when executed, determines the set of overlapping communities within the network, where each community consists of a set of nodes and every node in the network is within at least one community. As shown, a community 402 includes a set of nodes A1, A2, A3 and A4 connected by their corresponding edges and a community 404 includes a set of nodes A4, A5, A6, A7 and A8 connected by their corresponding edges. Further, communities 402 and 404 overlap (see, 406) with the node A4 belonging to both the communities 402, 404.

The overlapping communities 402 and 404 are used to define a community vector for each song. In an example scenario, it is assumed that there are total K communities ($C_1, C_2, \ldots, C_K$). For the overlapping communities, every node belongs to at least one community. In an example implementation, for every node 'n', the system 110 determines a binary K-element vector 'Vn', where the $i^{th}$ element in 'Vn' is a nonzero element (i.e., equal to 1) if the node 'n' belongs to community Ci. It is understood that 'Vn' is a binary community vector, where 'n' belongs to a song (such as any of the nodes A1-A8) in the network and the elements of the vector 'Vn' are all the communities (such as the communities 402 and 404) detected by the community detection algorithm. Therefore, if a node 'n' (song or audio file) belongs to a particular community of the network, the corresponding element of the vector 'Vn' will be 1, and if not, it will be 0. For example, considering only two communities 402 (e.g., $C_1$) and 404 (e.g., $C_2$), a community vector for the node A4 will be A4=[1, 1] and a community vector for the node A7 will be A7=[0, 1]. The segregations of the songs in the set of overlapping communities for calculation of probability distributions have several benefits and these are explained with reference to FIG. 5A.

First Method of Computation of Probability Distribution

Figure 5A:
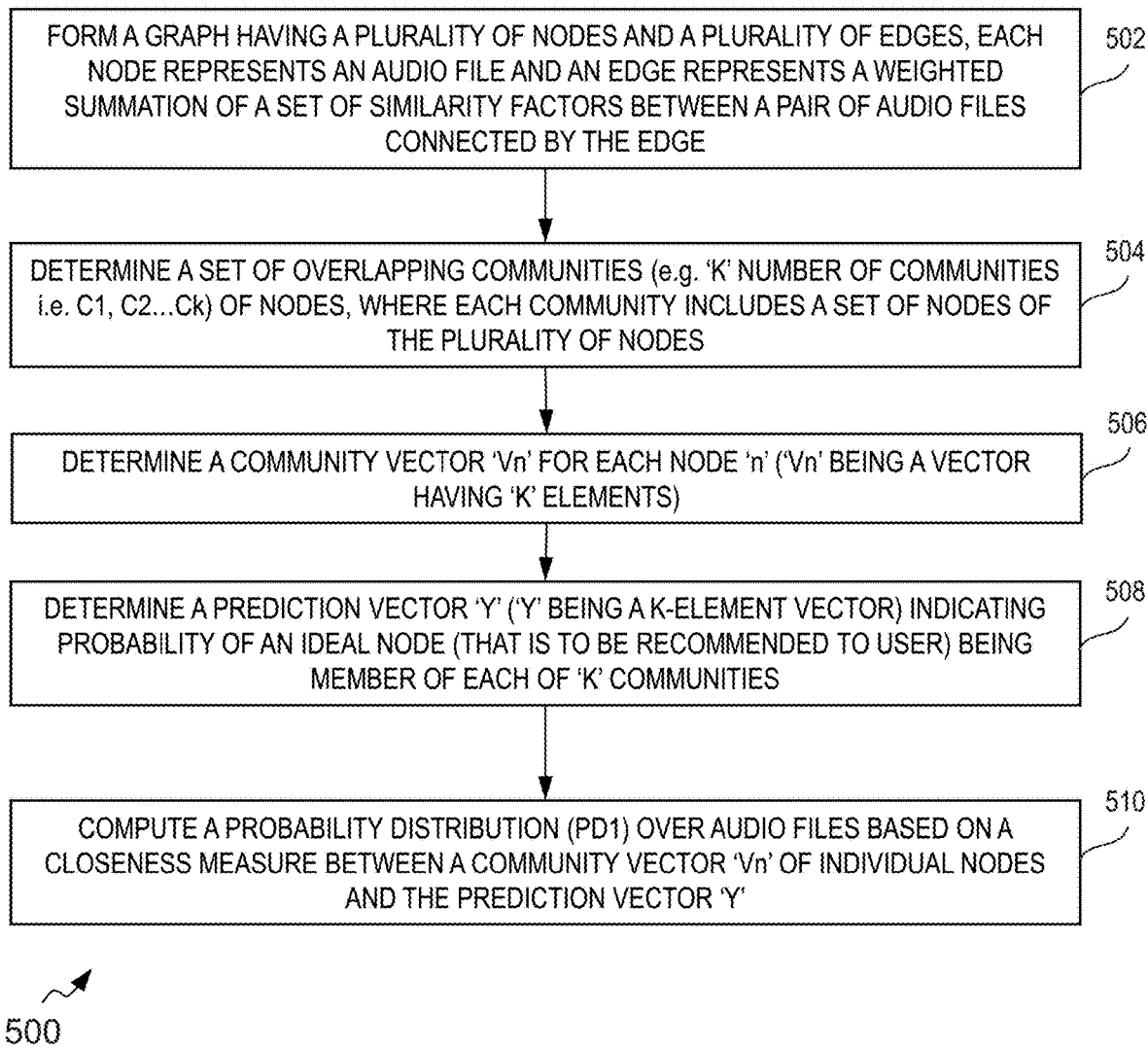
FIG. 5A is a flow diagram of a method for computing a probability distribution over a plurality of audio files, in accordance with an example embodiment of the present disclosure.

FIG. 5A is a flow diagram of a first method 500 for computing a probability distribution over a plurality of audio files, in accordance with an example embodiment of the present disclosure. The various steps and/or operations of the flow diagram, and combinations of steps/operations in the flow diagram, may be implemented by, for example, hardware, firmware, a processor, circuitry and/or by a system such as the system 110 of FIG. 1 and by a combination of a user device associated with a user. The steps and/or operations of the method 500 are not necessarily performed in a sequence, and they may be performed simultaneously or in a sequence different than that of shown in FIG. 5A. Further, some steps and/operations may have a plurality of sub-steps, or even some of the steps/operations may be performed together in a joint manner.

At 502, the method 500 includes forming a graph using a plurality of nodes and a plurality of edges. Each node represents an audio file and an edge of the plurality of edges represents a weighted summation of a set of similarity factors between a pair of audio files connected by the edge. The system is configured to determine the weight associated with each edge of the two connecting nodes based on various similarity factors using the equation (1) as explained with reference to FIG. 3. These weights are utilized by the system to determine the set of overlapping communities.

At 504, a set of overlapping communities (e.g., C1, C2 . . . Ck) is determined. Each community includes a set of nodes from the plurality of nodes within the graph and each node in the graph belongs to at least one community. An exemplary representation of overlapping communities is explained with reference to FIG. 4.

At 506, for each node of the plurality of nodes, a community vector is determined. For instance, for each node 'n', a community vector 'Vn' is determined, where Vn includes K number of elements for the set of overlapping communities.

At 508, a prediction vector 'Y' is determined. The prediction vector 'Y' is also a K element vector, and it indicates the probability of the ideal node (which is to be recommended to the user) being a member of each of the respective communities.

In an example of 'K' being the total number of communities in the user's songs network, a K-element prediction vector 'Y' specifies the prediction of the ideal song (which is to be recommended to the user) belonging to each of the 'K' communities. For example, each element in the prediction vector 'Y' is a prediction value (for example, a number between 0 and 1) that specifies the probability of the ideal song (which is to be recommended to the user) belonging to the corresponding community. The prediction vector 'Y' can be represented as follows:

$$Y=[p_1,p_2,\ldots,p_k] \quad (2)$$

where '$p_i$' represents the prediction value associated with the ideal song (which is to be recommended to the user) belonging to community '$C_i$'.

In at least one embodiment, the prediction vector 'Y' is determined by training a machine learning model based on the plurality of contextual features associated with the user and the user's past data samples generated based on the music listening patterns. The system 110 is configured to determine one or more models or a combination of models suitable for training the machine learning, such as, but not limited to, neural networks, decision trees, regression models, and the like. The K-element prediction vector 'Y' specifies the machine learning model's prediction of the song (which is to be recommended to the user) belonging to each of the K communities by taking the values of the contextual information of the user as input in the form of an input vector 'X'.

In an embodiment, the prediction vector 'Y' is determined by training a machine learning model using the user's previous data points and inputting the user's current contextual information to the trained model to get the desired vector 'Y'. In one example embodiment, the machine learning model is trained by the system 110 based on receiving one or more user preferences associated with the plurality of audio files. The one or more preferences include liking and disliking of songs provided by the user (such as the user 102/the user 104/user 106) through the UI of the user device (such as any of the corresponding user devices 108*a-c*) for the audio files. It is understood that a liked song is fed with a positive weight and a disliked song is fed with a negative weight for computing the prediction.

At 510, the method 500 includes computing a probability distribution (e.g., PD1) over the plurality of audio files. The probability distribution is computed using one or more criteria. In this embodiment, example of the one or more criteria is a closeness measure between a community vector 'V' of individual nodes and the prediction vector 'Y'. It is to be noted that the probability distribution is computed over all of the audio files, which means the probability distribution includes normalized probability values for all of the audio files. Herein, a probability value of an individual audio file (say node 'n') depends on a closeness measure between the community vector 'Vn' for the node 'n' representing the individual audio file and the computed prediction vector 'Y'.

The closeness measure between the community vector and the prediction vector can be computed in many suitable ways. Without limiting to the scope of present disclosure, the closeness measure may be computed by performing a dot product comparison between the two vectors 'V' and 'Y' to compute the closeness measure between the both. The closeness measures across all the songs are then normalized to provide a probability distribution over the plurality of the songs.

It will be appreciated by those skilled in the art that usage of the set of overlapping communities (i.e. community vectors for songs) in determination of the PD1 (also in PD2 described with reference with FIG. 5B) has many benefits, and such benefits are even more pronounced when there is a large number of songs in the user's library. For instance, consider an example scenario (not in accordance with any embodiment of present disclosure) where the concept of community vector is not used. In this example scenario, a machine learning model would simply be predicting the probability of each song, and such operation is computationally intensive if the number of songs are in the range of thousands or more. It would be apparent to those skilled in the art that training such a model would yield a lot of noise, inaccuracies and bias. On the other hand, with the embodiments of present disclosure utilizing the concept of overlapping communities, the number of communities are typically a fraction of the total number of songs. Usage of the overlapping communities enables the system to make use of relationships (i.e. similarity in at least some parameters) between songs for computation of the probability distribution. More specifically, under the model proposed by the present disclosure (i.e. community-structured model), for computing a probability value for a song 'n' in the probability distribution, data points related to other songs in the one or more communities of the song 'n' are also used effectively to provide increase accuracy in a less computationally intensive process. However, in the example scenario (not in accordance with any embodiment of present disclosure), a probability value for every song would only benefit from data points corresponding to that song, leading to an ineffective process.

Further, some embodiments of the present invention use the concept of overlapping communities rather than simple distinct communities, and this can result into almost unique community vectors (calculated at operation 556) for songs, thereby alleviating any ambiguity in ranking of songs. The benefits of the overlapping communities as compared to distinct communities can be explained with the following example.

Consider an example of a network of four songs S1, S2, S3, and S4. In this example, two distinct communities C1 and C2 are created, where C1 includes S1 and S2 and C2 includes S3 and S4. The community vectors for songs in this example scenarios are as follows:

$$S1=[1,0], S2=[1,0], S3=[0,1], S4=[0,1]$$

It is evident from the above community vectors that S1 and S2 have the same community vector, and S3 and S4 also have the same community vector. In this example, the prediction vector yields Y=[0.5,0] for both S1 and S2. Hence, S1 and S2 would always yield the same rank/probability in the ranking of songs, and it leads to confusion as to which is a higher ranked song among S1 and S2, and also ambiguity in deciding which song should be recommended first to the user.

Now, considering a use case of the overlapped community, two more communities—C3 including S1 and S3 and C4 including S2 and S4 are introduced in addition to already existing communities C1 and C2. The community vectors for songs in this scenarios (i.e. as per at least one embodiment of present disclosure) are as follows:

S1=[1,0,1,0],S2=[1,0,0,1],S3=[0,1,1,0],S4=[0,1,0,1]

It is evident from the above community vectors that each song now has its own unique community vector, which rectifies the same-rank problem as present in the example scenario that used non-overlapping communities.

Second Method of Computation of Probability Distribution

Another embodiment of computation of probability distribution includes computing the prediction vector 'Y' that takes into account the recent songs that the user liked/disliked and the community vectors associated with those songs. In this embodiment, the prediction vector 'Y' is updated whenever the user accesses the songs and a like/dislike input associated with the one or more songs is received from the user. This method utilizes information about the recently played songs and not the user's current contextual information to make a prediction. The existence of communities allows this method to learn the relationship among the songs based on a wide variety of factors and to make a prediction based on those relationships and the songs that were recently played. This method is explained with reference to FIG. 5B.

Figure 5B:
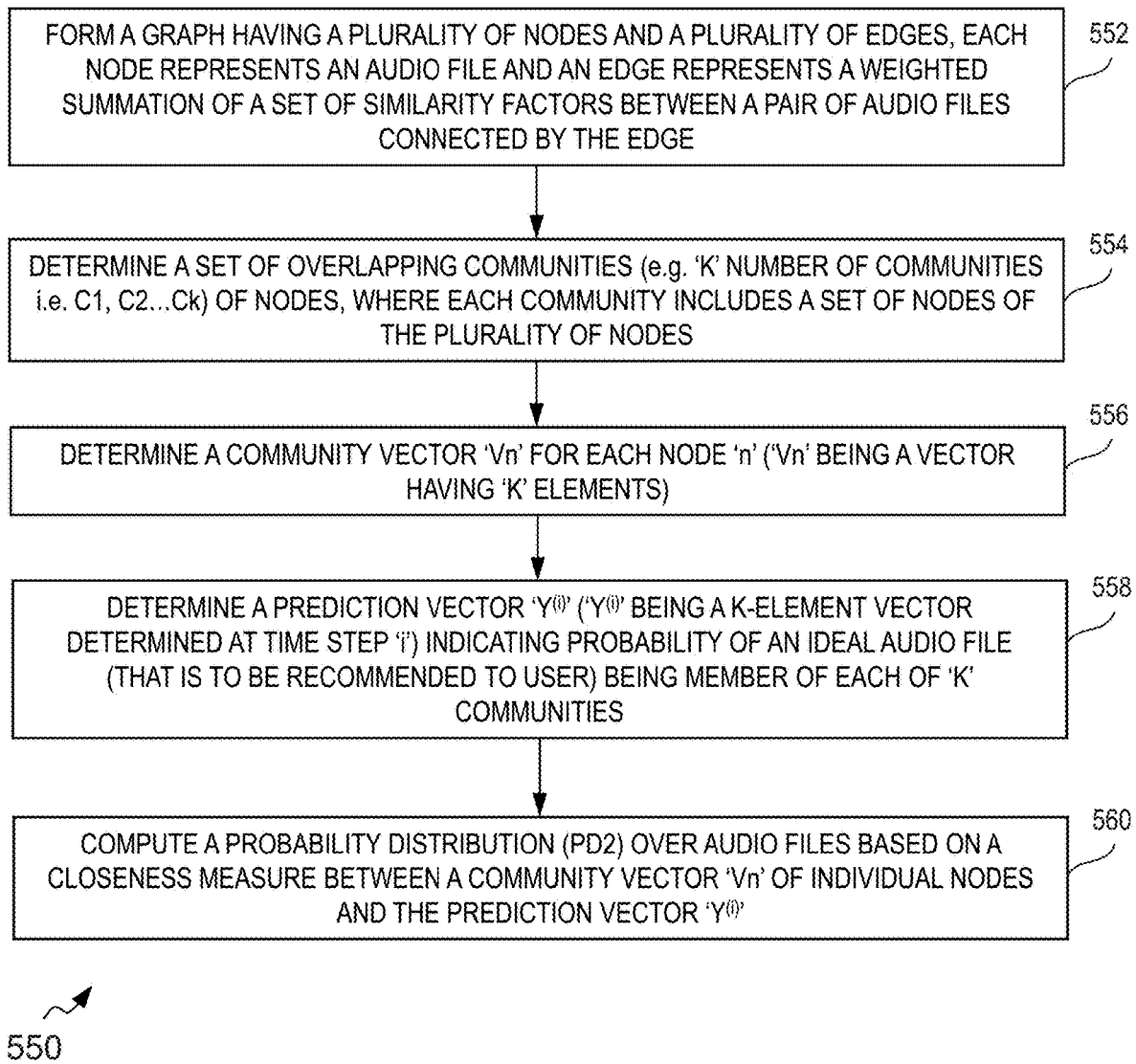
FIG. 5B is another flow diagram of a method for computing a probability distribution over a plurality of audio files, in accordance with an example embodiment of the present disclosure.

FIG. 5B is a flow diagram of a second method 550 for computing a probability distribution (PD2) over a plurality of audio files, in accordance with an example embodiment of the present disclosure.

The method 550 includes the operations 552, 554 and 556, which are same as the operations 502, 504 and 506, respectively.

At operation 558, the method 550 includes determining prediction vector 'Y'. Herein, the prediction vector 'Y' is determined based on a criteria including information of recent song(s) that are played. In an embodiment, every time a song is liked/disliked by the user, the prediction vector 'Y' is updated. The prediction vector 'Y', at any given time instant 'i' may be termed as $Y^{(i)}$. In one embodiment, if the system (e.g., system 110) detects that the user has not listened to any songs for a predetermined time-period, the system initializes the prediction vector Y to zeros (i.e., $Y^{(i)}=0$). All of the information such as whether the user listened to the audio file or user provided his like/dislike input for the audio file, are readily available to the system in form of data samples (i.e. step 202 described reference to FIG. 2). In an embodiment, at the current time step 'i', the prediction vector $Y^{(i)}$ for a node corresponding to an audio file at a time step 'i' is determined (or updated) based on following equation:

$$Y^{(i)}=(\alpha m V^{(i-1)})+((1-\alpha)Y^{(i-1)}) \quad (3)$$

In the above equation (3), '$\alpha$' is a predetermined scalar value. For example, '$\alpha$' is a value between 0-1 and optimally chosen by the system 110. It is understood that the optimal value of '$\alpha$' can be different from user to user. Further, '$\alpha$' can be different even in different situations for the same user as detected by the system 110. Further, in the above equation (3), 'm' is either a positive or a negative scalar value based on whether the song listened to at a time step 'i–1' was liked or disliked by the user through the UI of the user device, respectively.

Accordingly, $Y^{(i)}$ i.e. the prediction vector is updated at each time step 'i' based on the community vector 'V' associated with the audio file the user listened to at the time step 'i–1', and the updated $Y^{(i)}$ is used for the calculation of the probability distribution over the plurality of songs.

At operation 560, the method 550 includes computing a probability distribution (e.g., PD2) over the plurality of audio files. The probability distribution is computed using one or more criteria. In this embodiment, example of the one or more criteria is a closeness measure between a community vector (V) of individual nodes and the prediction vector $Y^{(i)}$, where $Y^{(i)}$ is computed based at least on information of the recent playback of songs and user's input such as whether user has liked or disliked the song.

Third Method of Computation of Probability Distribution

In another embodiment, the probability distribution (e.g., PD3) can also be computed based on one or more criteria. Examples of such criteria include general factors such as how the user has interacted with each song, and such factors are directly used to compute a probability distribution. Some examples of the criteria include time elapsed since a song is played last, a number of times a song is played, number of times a song is liked or disliked, etc. It is noted that one or more of these criteria (if not all) may be used for the computation of the probability distribution (PD3), as shown and explained with reference to FIG. 6.

Figure 6:
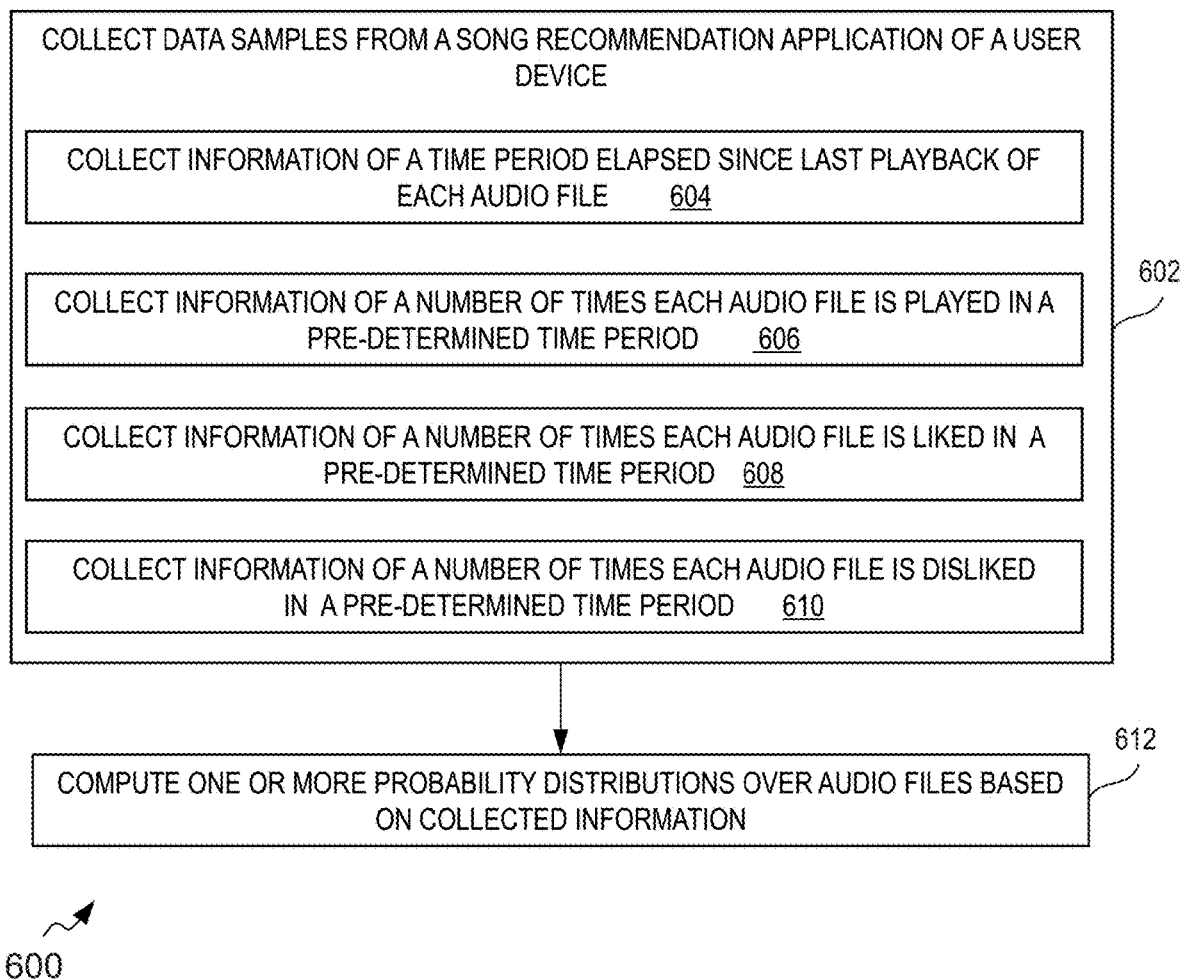
FIG. 6 is yet another flow diagram of a method for computing a probability distribution over a plurality of audio files, in accordance with an example embodiment of the present disclosure.

FIG. 6 is another flow diagram of a method 600 for computing a probability distribution (PD3) over a plurality of audio files, in accordance with an example embodiment of the present disclosure. The various steps and/or operations of the flow diagram, and combinations of steps/operations in the flow diagram, may be implemented by, for example, hardware, firmware, a processor, circuitry and/or by the system 110 of FIG. 1 and by a combination of a user device associated with a user and the system 110 and/or by a different electronic device associated with the execution of software that includes one or more computer program instructions.

At 602, the method 600 includes collecting data samples associated with the plurality of audio files from the user device. Collection of the data samples includes performing one or more of operations 604, 606, 608 and 610, either simultaneously or in any order.

At 604, the method 600 include determining (i.e. collecting information) a time-period elapsed since last playback of each audio file (song) of the plurality of audio files. For instance, the system (such as the system 110) is configured to compute the time elapsed from the last time a song was played and associate it with that song.

At 606, the method includes collecting information on a number of times a song is played in a pre-determined time period. Value of pre-determined period may be customized based on user preference or any other factors.

At 608, the method includes collecting information on a number of times a song is liked in the pre-determined time period.

At 610, the method includes collecting information on a number of times a song is disliked in the pre-determined time period.

In some optional embodiments, some other criteria such as—if a particular song was listened to by the user completely or was left in the middle, if a particular song was suggested by the user to other people in his social network, if a particular song was tagged as a favorite song, if a particular song was scheduled for listening to it later, if a particular song was swiped left or right within the application, etc., may also be collected in form of data samples.

At 612, the method 600 includes computing probability distribution (PD3) based on the information collected (or determined) at one or more of the operations 604 to 610, and other optional operations. In another embodiment, the method 600 includes collecting separate probability distributions based on each of the criteria such as information collected in operations 604 to 610 and other optional operations.

For example, depending on the operation 604, a probability distribution (PD3a) over the audio files may be calculated, in which a probability value for an audio file is more if the audio file is not played for a long time. In an example, system is configured to assign probability values to the audio files in increasing order based on their elapsed time (i.e., the higher the elapsed time, the higher the song's probability value). In this manner, priority (greater probability values) is given to those songs that the user has not listened to for a longer period of time. However, this may also be done in opposite manner depending upon the user preference.

In another example, depending upon the operation 606, a probability distribution (PD3b) over the audio files may be calculated, in which a probability value for an audio file is more if the audio file is played for less number of times, as compared to other audio files played frequently. Similarly, depending upon the operation 608, a probability distribution (PD3c) over the audio files may be calculated, in which a probability value for an audio file is more if the audio file has a more number of likes, as compared to other audio files having less number of times liked by the user. Similarly, depending upon the operation 610, a probability distribution (PD3d) over the audio files may be calculated, in which a probability value for an audio file is more if the audio file is disliked a fewer number of times.

Fourth Method of Computation of Probability Distribution

In another embodiment of computation of probability distribution (PD4), an order of playback of songs serves as a criteria. This criteria (order of playback of songs) can be explained with help of a directed graph shown in FIG. 7. Thereafter, the fourth method of computation of the probability distribution (PD4) is described with reference to FIG. 8.

Figure 7:
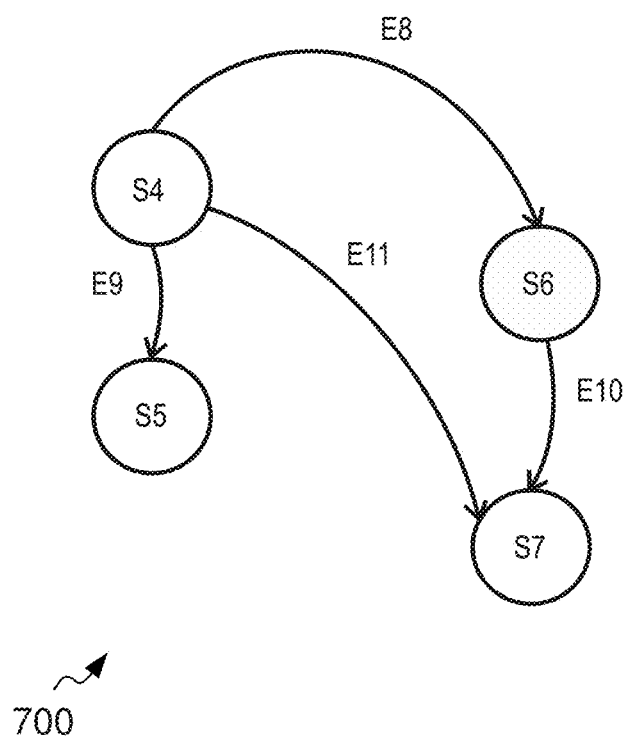
FIG. 7 shows a simplified representation of a directed graph formed using a plurality of nodes and a plurality of edges, in accordance with an example embodiment of the present disclosure.

FIG. 7 shows a simplified representation of a directed graph 700 formed using a plurality of nodes and a plurality of edges, in accordance with an example embodiment of the present disclosure. In at least one embodiment, the system 110 is configured to form the directed graph 700 for arranging the plurality of songs based on a specific order. As shown, the directed graph 700 includes a plurality of nodes such as S4, S5, S6 and S7 representing corresponding songs and a plurality of directed edges such as E8, E9, E10 and E11 connecting the pair of nodes. It is noted that a directed edge between two nodes (songs) represents that the two songs were played and liked during a predefined time interval and the direction of the edge indicates the node that the edge originates from is the song that was played before the second node/second song. For example, edge E8 represents song S4 was played before song S6, edge E9 represents song S4 was played before song S5, edge E10 represents song S6 was played before song S7 and edge E11 represents song S4 was played before song S7. The system 110 is also configured to associate a weight attribute with each of the plurality of edges E8-E11 based on the time lapse between the two songs. In one example embodiment, the weight is a value between 0 and 1. The weight associated with each edge is utilized by the system 110 to determine a successive score for each song to measure successiveness to a song listened to at a preceding time step based on the directed graph. This is explained in detail hereinafter with reference to FIG. 8.

Figure 8:
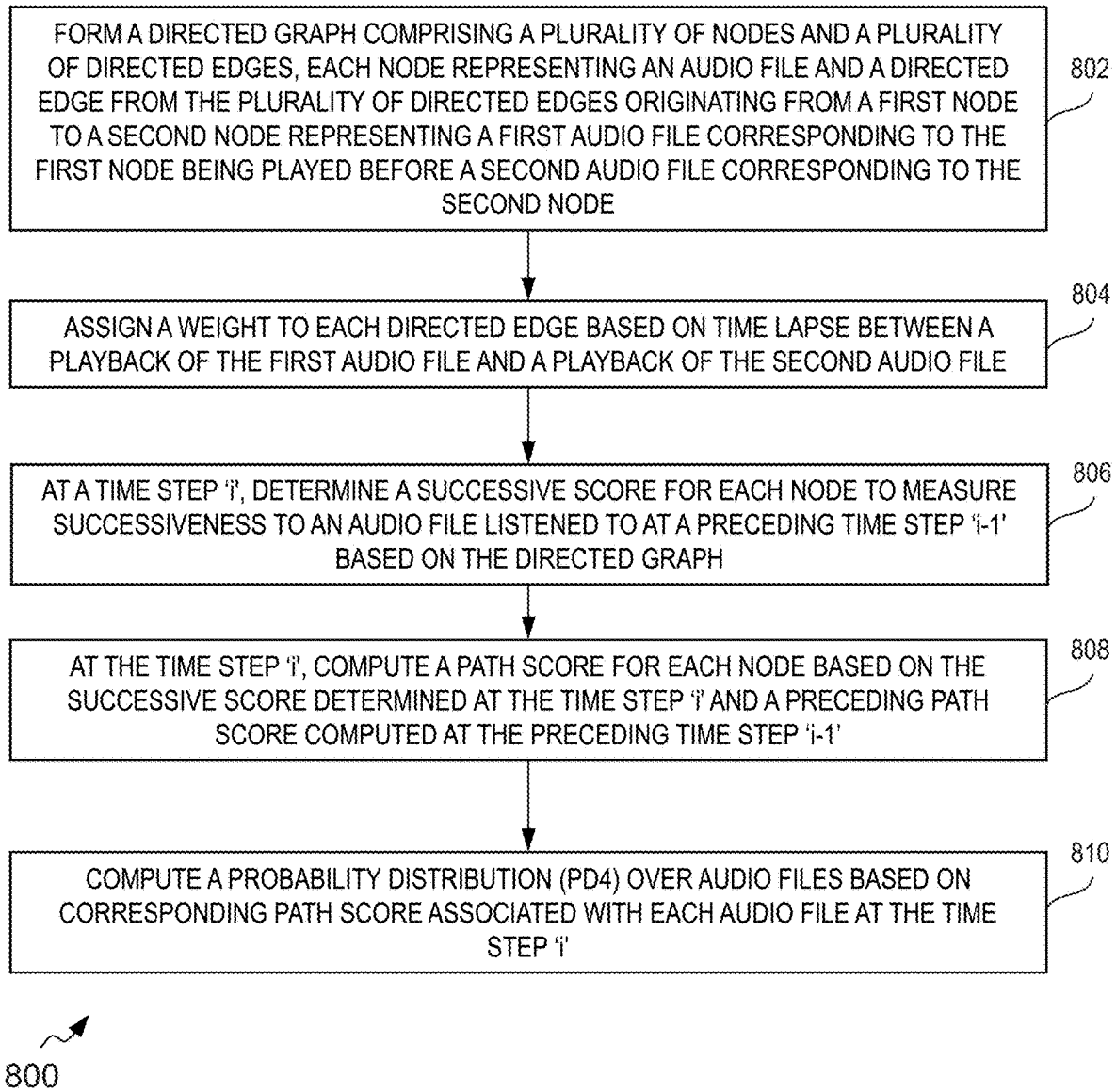
FIG. 8 is a still another flow diagram of a method for computing a probability distribution over a plurality of audio files, in accordance with an example embodiment of the present disclosure.

FIG. 8 is a yet another flow diagram of a method 800 for computing a probability distribution (PD4) over a plurality of audio files, in accordance with an example embodiment of the present disclosure. The various steps and/or operations of the flow diagram, and combinations of steps/operations in the flow diagram, may be implemented by, for example, hardware, firmware, a processor, circuitry and/or by the system 110 of FIG. 1 and by a combination of a user device associated with a user and the system 110 and/or by a different electronic device associated with the execution of software that includes one or more computer program instructions. The steps and/or operations of the method 800 are not necessarily performed in a sequence, and they may be performed simultaneously or in a different sequence than that of shown in FIG. 8. Further, some steps and/operations may have a plurality of sub-steps, or even some of the steps/operations may be performed together in a joint manner.

At 802, a directed graph is formed using a plurality of nodes and a plurality of directed edges. Each node represents an audio file and a directed edge from the plurality of directed edges originating from a first node to a second node represents a first audio file corresponding to the first node being played before a second audio file corresponding to the second node. In an embodiment, all the nodes that form the directed graph, represent audio files (songs) that are liked by the user. The system (e.g. the system 110) is configured to form a directed graph such as the directed graph 700 of the plurality of nodes (S4-S8) and the plurality of directed edges (E8-E11) as explained with reference to FIG. 7.

At 804, a weight is assigned to each directed edge based on time lapse between a playback of the first audio file and a playback of the second audio file. Herein, weight assigned to a directed edge is normalized between 0 and 1.

At 806, at a time step 'i', a successive score for each node is determined to measure successiveness to an audio file listened to at a preceding time step 'i-1' based on the directed graph. In one embodiment, the server system is configured to determine that the user has not listened to any songs for a predefined time-period. A successive score for a node 'n' representing an audio file at a time step 'i' is determined based on the following equation:

$$u_n^{(i)} = \sum_{p=1}^{P_n^{(i)}} \prod_{j=1}^{E_p} W_{(p,j)} \qquad (4)$$

In the above equation (4), $P_n^{(i)}$ is a total number of existing simple paths from the songs listened to at time step 'i' to song 'n'. It is noted the system 110 is configured not to consider paths with repeated vertices as they already include a desired path with an added loop. The loop path is redundant and therefore is not considered by the system 110 for computing the successive score.

'$E_p$' is a total number of directed edges on a corresponding path 'p'.

'$W_{(p,j)}$' represents a weight of the $j^{th}$ edge of the path 'p'. As the weight assigned to each directed edge is a scalar value between zero and one (which is the normalized value of the time lapse between a playback of the first song and a playback of the second song), the longer the distance of the path of the corresponding edge, the smaller the value of weight associated to that path.

At 808, at the time step 'i', a path score for each node is computed based on the successive score determined at the time step 'i' and a preceding path score computed at the preceding time step 'i-1'. The system 110 is configured to initialize each song's path score '$r_n$', where 'n' corresponds to the song's node, to zero. A path score for the node 'n' at the time step 'i' is determined based on the following equation:

$$r_n(i) = (\alpha u_n(i-1)) + ((1-\alpha) r_n(i-1)) \quad (5)$$

In the above equation (5), 'α' is a predetermined scalar value. For example, 'α' is between 0-1 and optimally chosen by the system 110. It is understood that the optimal value of 'α' can be different from user to user. Further, 'α' can be different in different situations for the same user as detected by the system 110.

Further, '$u_n$' corresponds to a succession score for the node 'n', as computed in equation (4).

Further, '$r_n(i)$' corresponds to the path score for the node 'n' at the time step 'i' based on the succession score and a path score for the node 'n' of the preceding time step 'i−1'.

At 810, the probability distribution (PD4) over the plurality of audio files is computed based on the corresponding path score associated with each audio file at time step 'i'. It is understood that a higher value of '$r_n$' would give the node a higher probability value.

Accordingly, the present disclosure offers various ways of calculations of probability distributions over the audio files based on different criteria, for example, as explained with reference to FIGS. 3 to 8. For instance, probability distributions PD1, PD2, PD3 (or PD3a, PD3b, PD3c, and PD3d) and PD4 are computed. Each of the these probability distributions may have different relative weightage. For example, without limiting to the scope of present disclosure, the PD1 and PD2 may have more weightage as compared to PD4 with the least weightage to PD3. Such probability distributions are used to create a ranking of the plurality of audio files (as described with reference to operation 206 of FIG. 2). Further, the songs are recommended to the user based on the ranking of the audio files (explained with reference to 208 of FIG. 2).

System Description

The methods described with reference to flowcharts of FIGS. 2, 5A, 5B, 6 and 8 are performed by a system that can be part of an external server system. However, in some scenarios, the user device may also have a computationally intensive device and the system can be embodied in such user device. One exemplary description of the system is described with reference to FIG. 9.

Figure 9:
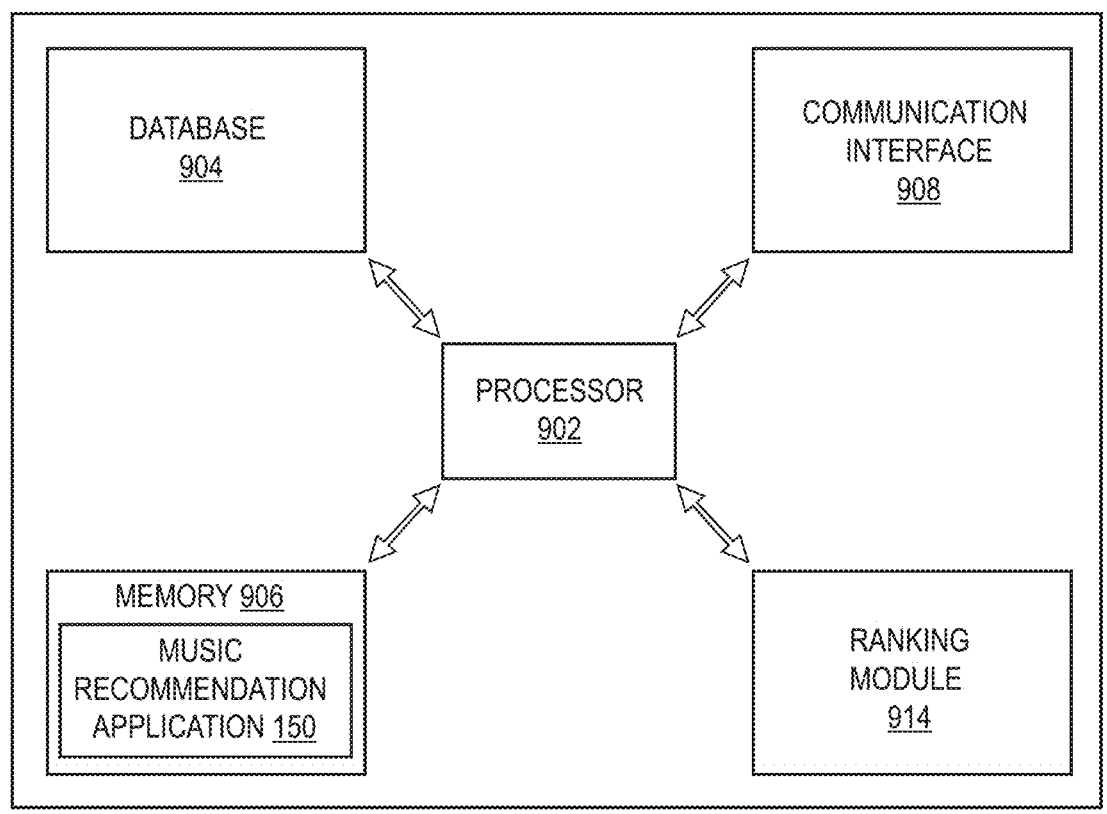
FIG. 9 shows a block diagram representation of a system capable of implementing at least some embodiments of the present disclosure.

FIG. 9 shows a block diagram representation of the system 110 capable of implementing at least some embodiments of the present disclosure. The system 110 includes at least one processor such as a processor 902, a database 904, at least one memory such as a memory 906, a communication interface 908 and a ranking module 914. The processor 902 is communicably coupled with the database 904, the memory 906, the communication interface 908 and the ranking module 914. In at least one embodiment, the system 110 may be accessible to one or more user devices (such as the user device 108a-c), through a communication network (e.g. the network 120). It is understood that the system 110 may include fewer or more components than those depicted in FIG. 9 without deviating from the scope of the invention.

In an embodiment, the memory 906 can be embodied as a part of the processor 902. The memory 906 includes machine executable instructions for the MR application 150. In various embodiments, the memory 906 is a storage device embodied as one or more volatile memory devices, one or more non-volatile memory devices, and/or a combination of one or more volatile memory devices and non-volatile memory devices, for storing micro-contents information and instructions. The memory 906 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

Further, the processor 902 is capable of executing the machine executable instructions stored in the memory 906 for performing one or more operations. It is understood that the processor 902 can be configured in a variety of ways. For example, the processor 902 may be embodied as a multi-core processor, a single core processor, or a combination of one or more multi-core processors and one or more single core processors. For example, the processor 902 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The processor 902 may be configured to include one or more algorithms such as machine learning algorithms and community detection algorithms. The processor 902 is configured to receive a plurality of data samples generated from the MR application 150 in a user device (e.g. user devices 108a, 108b or 108c) of the user for a plurality of audio files. The plurality of data samples include a plurality of contextual features associated with the user and listening patterns of audio files from the set of audio files associated with the user, among other various factors. Further, the processor 902 is configured to collect/receive each data sample form the plurality of data samples at each timestamp. In one embodiment, the timestamp corresponds to an audio file being liked by the user through the UI of the user device and an audio file being disliked by the user through the UI of the user device. The processor 902 is configured to compute the probability distributions (e.g., PD1, PD2, PD3 & PD4) over the audio files based on one or more pre-defined criteria using the collected data samples.

The processor 902, in conjunction with the ranking module 914, is configured to determine a ranking of plurality of audio files from the one or more weighted probability distributions computed using above mentioned approaches. The processor 902, in conjunction with the communication interface 908, send signals to the user device for recommendations of songs. Thereafter, the user device causes display of the recommended songs on the UI of application installed in the user device. The UI of the application in the user device allows the user to like/dislike a song (as explained hereinafter with reference to FIG. 10), to select a song from the list of recommended songs for listening (as explained hereinafter with reference to FIG. 11) and the like on the user device associated with the user.

The communication interface 908 is configured to facilitate communication between the system 110 and the user device. The communication may be achieved over a communication network (e.g., the network 120). In one embodiment, the communication interface 908 includes a transceiver for wirelessly communicating information to, or receiving information from, the user device (such as user devices 108a-c of FIG. 1) or other suitable display device, and/or another type of remote processing device. In another embodiment, the communication interface 908 is capable of facilitating operative communication with the remote devices and a cloud server using API (Application Program Interface) calls. Such communication may be achieved over the communication network such as the network 120.

The database 904 may be any computer-operated hardware suitable for storing and/or retrieving data, such as, but not limited to storing profile information of a plurality of users, one or more user preferences of the plurality of users, updated ranking of audio files to be recommended to the plurality of users, user-defined playlists of the audio files, updated library of the plurality of audio files and the like. In various embodiments, the database 904 may include multiple storage units such as hard disks and/or solid-state disks in a redundant array of inexpensive disks (RAID) configuration. The database 904 may include a storage area network (SAN) and/or a network attached storage (NAS) system. In some alternate embodiments, the database 904 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc. The system 110 include one or more storage interfaces for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 902 with access to the database 904.

Figure 10:
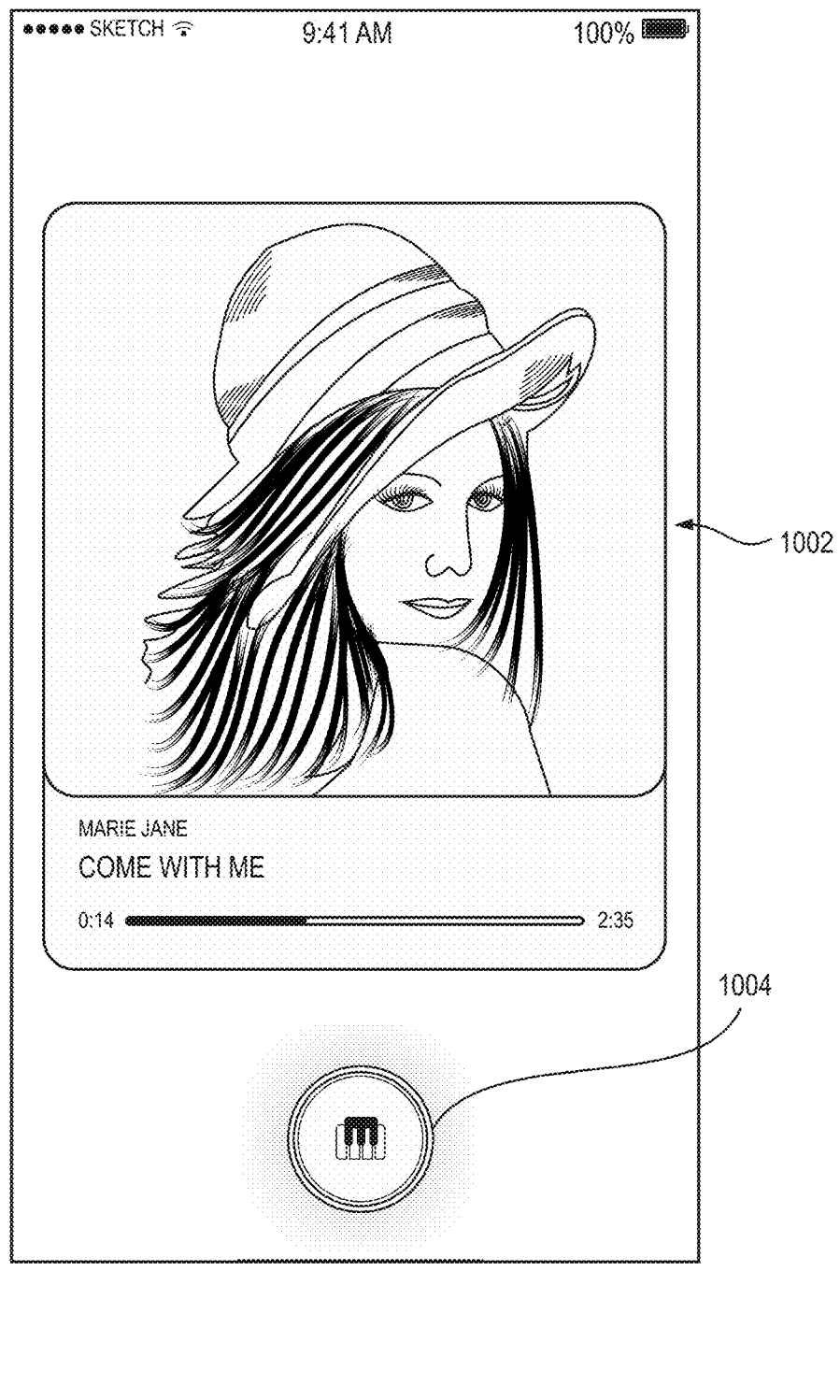
FIG. 10 shows a simplified representation of a UI configured to display one or more options to facilitate a user for providing one or more user preferences for a song being played, in accordance with an example embodiment of the present disclosure.

FIG. 10 shows a simplified representation of a UI 1000 configured to display one or more options to facilitate a user for providing one or more user preferences for a song being played, in accordance with an example embodiment of the present disclosure. The UI 1000 is depicted to include information of a song being played as shown by an information box 1002. The information box 1002 exemplarily includes name of the song—'Come with me', artist of the song—'Marie Jane' and a relevant image of the song. The UI 1000 also includes a clickable icon 1004 using which the user can provide his preference about disliking the song being played. Upon receiving the user input of disliking the song, the system 110 is configured to re-compute the ranking of the songs to be recommended to the user and start playing a new song that ranked the highest based, in part, by the fact that the user disliked the current song (Come with me). In other embodiments, If the user likes the song—'Come with me', he would listen to the song until the end. The system 110 is configured to consider the song being liked by the user, re-compute the ranking and recommend the next song that ranked the highest based, in part, by the fact that the user liked the current song.

Figure 11:
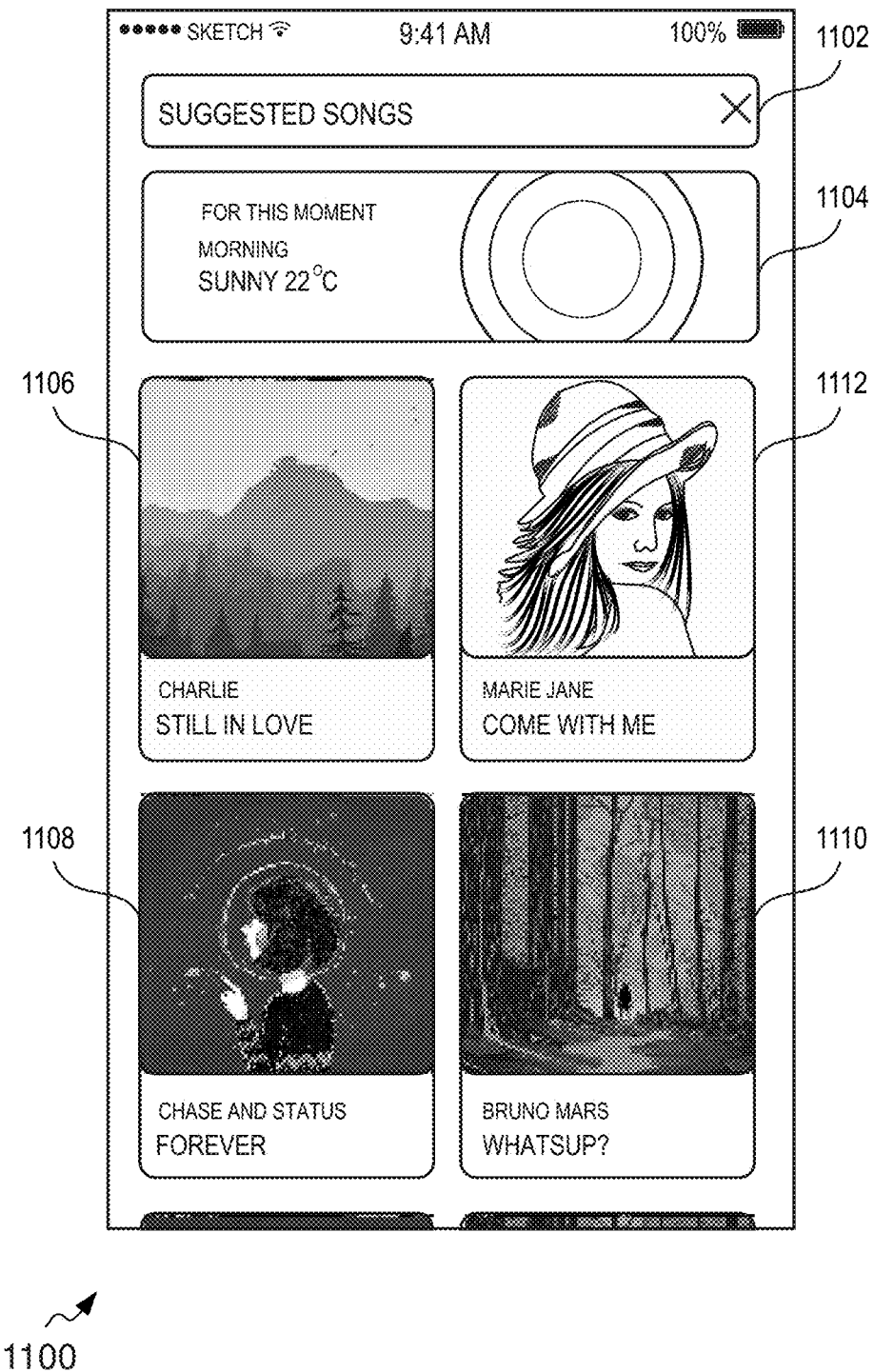
FIG. 11 shows a simplified representation of a UI configured to display one or more audio files as recommended to the user based on their ranking, in accordance with an example embodiment of the present disclosure.

FIG. 11 shows a simplified representation of a UI 1100 configured to display one or more audio files as recommended to the user based on their ranking, in accordance with an example embodiment of the present disclosure. The system 110 is configured to display a list of all the suggested songs based on their current context in order of their ranking as computed by the processor 902. The system 110 is configured to determine a number of songs to be displayed in an orderly manner such as the more likely songs displayed first (or at the top) based on the complete ranking of songs from the last time such a ranking was computed to play the current song.

As shown, the UI 1100 includes an actionable icon 1102 with text 'suggested songs' with a corresponding (X) button configured to facilitate the user to close the list of suggested songs. A click/touch input of the button (X) would direct the user to another UI such as a home page (not shown). The UI 110 further includes an information box 1104 displaying information about current contextual features of the user considered by the system 110 to generate the list of suggested/recommended songs. For example, the information box 1104 displays current weather condition—'Sunny 22° C.' and time of the day—'Morning' based on which the songs are recommended. The UI 1100 further includes a plurality of selectable icons such as 1106, 1108, 1110, and 1112 respectively displaying information about the recommended songs. The selectable icons 1106, 1108, 1110 and 1112 when touched/clicked by the user, would direct the user to a UI such as the UI 1000 where the corresponding song associated with the selected icon will be displayed and played by the system 110. For example, the selectable icon 1106 represents song name—'Still in love', artist name—'Charlie' and a relevant image of the song. The selectable icon 1108 represents song name—'Forever', artists' names—'Chase and Status' and a relevant image of the song. The selectable icon 1110 represents song name—'Whatsup?', artist name—'Bruno Mars' and a relevant image of the song. The selectable icon 1112 represents song name—'Come with me', artist name—'Marie Jane' and a relevant image of the song.

In one example embodiment, the system 110 is configured to facilitate the user not to approve of the recommended song using one or more UIs (not shown). In an alternate example embodiment, the system 110 is further configured to recommend a few different songs for the user selection in order to add diversity and propose a broad range of songs, instead of recommending only one song to the user based on the user's contextual information. This is achieved by the system 110 by selecting songs from different communities that are far apart in the network of plurality of songs.

Figure 12:
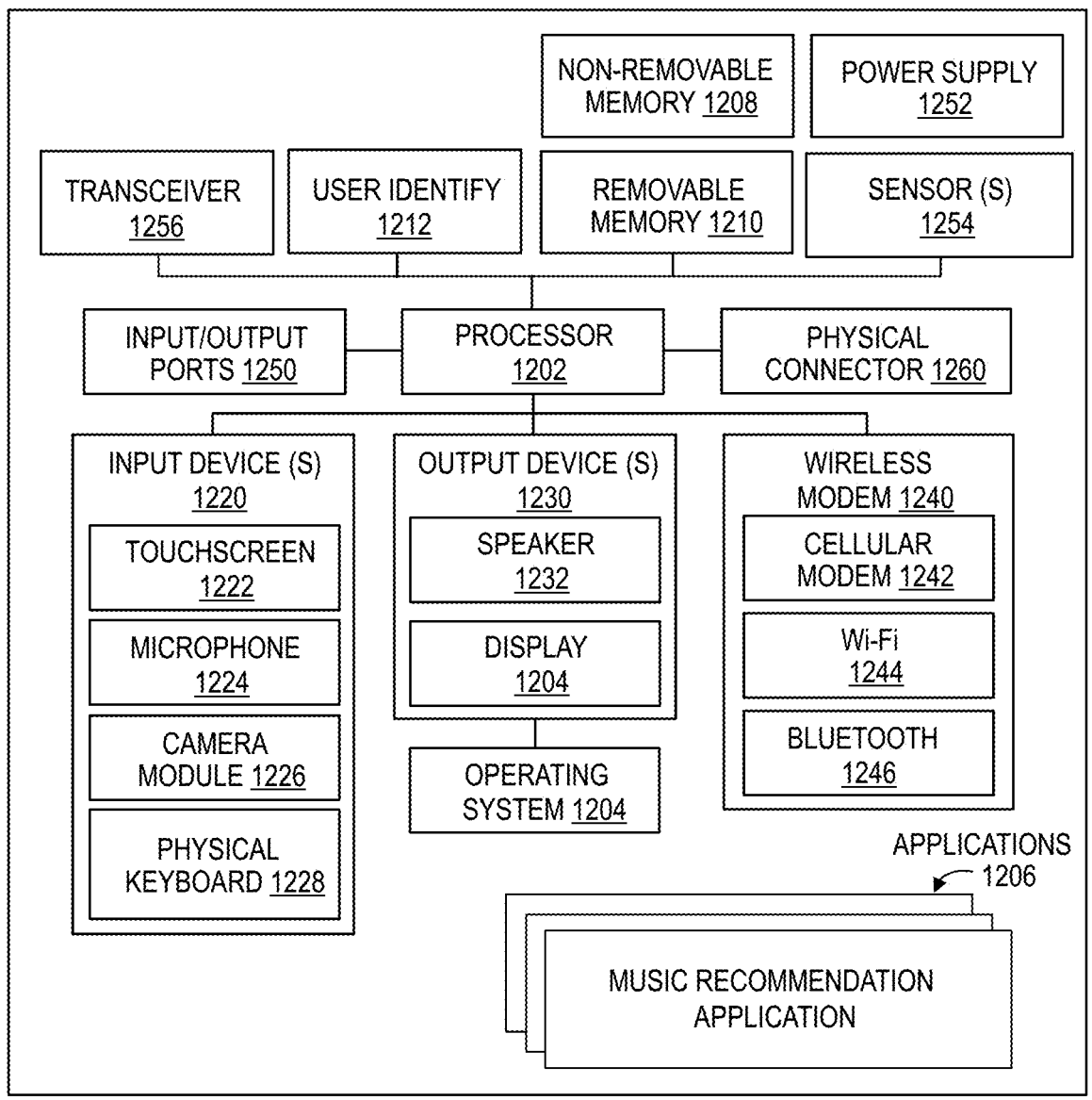
FIG. 12 shows a user device capable of implementing at least some embodiments of the present disclosure.

FIG. 12 shows a user device 1200 capable of implementing the various embodiments of the present invention. In an embodiment, the various operations performed by the system 110 may be implemented using an application in a computing device, such as the user device 1200. For example, the user device 1200 may correspond to an electronic device such as any of the computing devices 108a-c corresponding to the users 102, 104 and 106. The user device 1200 is depicted to include one or more applications 1206, including an application for music recommendation, which serves as an instance of the application downloaded from the system 110 and capable of communicating through API calls with the system 110 to recommend songs. In some embodiments, the system 110 may also be embodied in the user device 1200, and all the functions of the system 110 may be locally performed within the user device 1200.

It should be understood that the user device 1200 as illustrated and hereinafter described is merely illustrative of one type of device and should not be taken to limit the scope of the embodiments. As such, it should be appreciated that at least some of the components described below in connection with that the user device 1200 may be optional and thus in an example embodiment may include more, less or different components than those described in connection with the example embodiment of the FIG. 12. As such, among other examples, that the user device 1200 could be any of a mobile electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1200 includes a controller or a processor 1202 (e.g., a signal processor, microprocessor, ASIC, or other control and processing logic circuitry) for performing such tasks as signal coding, data processing, image processing, input/output processing, power control, and/or other functions. An operating system 1204 controls the allocation and usage of the components of the user device 1200 and support for one or more applications programs (see, applications 1206), such as music recognition (MR) application, that implements one or more of the innovative features described herein. In addition to music recognition application, the applications 1206 may include common mobile computing applications (e.g., telephony applications, email applications, calendars, contact managers, web browsers, messaging applications) or any other computing application. The music recognition application, in at least one example embodiment, may be configured to provide the logics to recommend songs, as explained with reference to FIGS. 1 to 11.

The illustrated user device 1200 includes one or more memory components, for example, a non-removable memory 1208 and/or removable memory 1210. The non-removable memory 1208 and/or removable memory 1210 may be collectively known as database in an embodiment. The non-removable memory 1208 can include RAM, ROM, flash memory, a hard disk, or other well-known memory storage technologies. The removable memory 1210 can include flash memory, smart cards, or a Subscriber Identity Module (SIM). The one or more memory components can be used for storing data and/or code for running the operating system 1204 and the applications 1206. The one or more memory components can be used for storing data and/or code for running the operating system 1204 and the applications 1206. The user device 1200 may further include a user identity module (UIM) 1212. The UIM 1212 may be a memory device having a processor built in. The UIM 1212 may include, for example, a subscriber identity module (SIM), a universal integrated circuit card (UICC), a universal subscriber identity module (USIM), a removable user identity module (R-UIM), or any other smart card. The UIM 1212 typically stores information elements related to a mobile subscriber. The UIM 1212 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1200 can support one or more input devices 1220 and one or more output devices 1230. Examples of the input devices 1220 may include, but are not limited to, a touch screen/a display screen 1222 (e.g., capable of capturing finger tap inputs, finger gesture inputs, multi-finger tap inputs, multi-finger gesture inputs, or keystroke inputs from a virtual keyboard or keypad), a microphone 1224 (e.g., capable of capturing voice input), a camera module 1226 (e.g., capable of capturing still picture images and/or video images) and a physical keyboard 1228. Examples of the output devices 1230 may include, but are not limited to a speaker 1232 and a display 1234. Other possible output devices can include piezoelectric or other haptic output devices. Some devices can serve more than one input/output function. For example, the touch screen 1222 and the display 1234 can be combined into a single input/output device.

A wireless modem 1240 can be coupled to one or more antennas (not shown in the FIG. 12) and can support two-way communications between the processor 1202 and external devices, as is well understood in the art. The wireless modem 1240 is shown generically and can include, for example, a cellular modem 1242 for communicating at long range with the mobile communication network, a Wi-Fi compatible modem 1244 for communicating at short range with an external Bluetooth-equipped device or a local wireless data network or router, and/or a Bluetooth-compatible modem 1246. The wireless modem 1240 is typically configured for communication with one or more cellular networks, such as a GSM network for data and voice communications within a single cellular network, between cellular networks, or between the user device 1200 and a public switched telephone network (PSTN).

The user device 1200 can further include one or more input/output ports 1250, a power supply 1252, one or more sensors 1254 for example, an accelerometer, a gyroscope, a compass, or an infrared proximity sensor for detecting the orientation or motion of the user device 1200, a transceiver 1256 (for wirelessly transmitting analog or digital signals) and/or a physical connector 1260, which can be a USB port, IEEE 1294 (FireWire) port, and/or RS-232 port. The illustrated components are not required or all-inclusive, as any of the components shown can be deleted and other components can be added.

In one embodiment, the disclosed methods 200, 500, 550, 600 and 800 or one or more operations of the methods may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Various example embodiments offer, among other benefits, techniques for establishing system and methods for song recommendation to the users using machine learning. More particularly, a music recommendation system is disclosed that makes its inference from the contextual information of a user as well as information known about the user's past music listening patterns to determine the best songs to be played according to the user's current context. Existing methods for song recommendation require a manual input from the user to recommend/play a song for the user at any given time. For example, a seed song for a radio station may be requested from the user to initiate searching of similar songs that match with the seed song for recommending songs. Other existing methods require the user to select a category of mood the user is feeling at a given time to recommend songs to the user. Disadvantages of such methods include, requiring manual inputs from the user, playing same set of songs for every user based on the category of mood they choose (i.e., no user-specific songs are recommended) and the like. Unlike existing methods, the system of present disclosure only and optionally requests the user whether the user likes or dislikes the song that is being played for the user at the time to consider those inputs for song recommendations. The user is no longer required to choose a station or a mood category whenever he/she desires to listen to the music rather the system is configured to automatically figure it out via the contextual features.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the system 110 and its various components may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations (for example, operations explained herein with reference to FIGS. 2, 5A-5B, 6 and 8). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:
1. A computer-implemented method, comprising:
receiving, by a processing system, a plurality of data samples generated from an application in a user device of a user for a plurality of audio files, wherein the plurality of data samples comprises a plurality of contextual features associated with the user, wherein the plurality of contextual features is of interest for determining a ranking of the plurality of audio files, wherein the plurality of contextual features comprise one or more of the following: a date or a weather condition, wherein the plurality of data samples is determined at least in part from at least one chance in at least one contextual feature of the plurality of contextual features of the user collected utilizing a plurality of sensing modules;
computing, by the processing system, one or more probability distributions over the plurality of audio files based on one or more pre-defined criteria, the one or more pre-defined criteria based on the plurality of data samples, wherein computing a probability distribution of the one or more probability distributions comprises:
from the received plurality of data samples, collecting at least one of: information of a time period elapsed since last playback of each audio file of the plurality of audio files,
information of a number of times each audio file is played in a pre-determined time period;
information of a number of times each audio file is liked, and
information of a number of times each audio file is disliked; and
computing probability value for each audio file of the plurality of audio files based on collected information to compute the probability distribution;

determining, by the processing system, a ranking of the plurality of audio files based on the one or more probability distributions over the plurality of audio files;

recommending, by the processing system, one or more audio files from the ranking of the plurality of audio files to the user through a User Interface (UI) of the user device in the application; and playing back the one or more audio files through the UI of the user device.

2. The method as claimed in claim 1, wherein computing a probability distribution of the one or more probability distributions comprises:

forming a graph comprising a plurality of nodes and a plurality of edges, each node representing an audio file and an edge of the plurality of edges representing a weighted summation of a set of similarity factors between a pair of audio files connected by the edge;

determining a set of overlapping communities, wherein each community comprises a set of nodes from the plurality of nodes within the graph and each node in the graph belongs to at least one community;

determining, for each node of the plurality of nodes, a community vector comprising K number of elements for the set of overlapping communities, K being a number of communities in the set of overlapping communities, wherein an element of the K number of elements for a node of the plurality of nodes denotes whether the node belongs to a community corresponding to the element;

determining a prediction vector comprising K number of prediction values, wherein a prediction value of the K number of prediction values represents a probability of an ideal audio file belonging to a community corresponding to the prediction value; and computing the probability distribution over the plurality of audio files based on a closeness measure between each of community vectors for the plurality of nodes and the prediction vector.

3. The method as claimed in claim 2, wherein the prediction vector is determined based on training a machine learning model based on the plurality of contextual features associated with the user.

4. The method as claimed in claim 3, wherein the machine learning model is trained based on receiving one or more data points associated with the plurality of audio files, the one or more data points being liking and disliking provided by the user through the UI of the user device for the plurality of audio files, in addition to the contextual features associated with each data point.

5. The method as claimed in claim 2, wherein the set of similarity factors between the pair of audio files connected by the edge is determined based on at least one of:

one or more audio features, the one or more audio features comprising a tempo, a rhythm, a loudness, and a pitch; and one or more non-audio features, the one or more non-audio features comprising one or more data points provided by the user for the plurality of audio files for a predetermined time interval.

6. The method as claimed in claim 1, wherein computing a probability distribution of the one or more probability distributions comprises:

forming a graph comprising a plurality of nodes and a plurality of edges, each node representing an audio file and an edge of the plurality of edges representing a weighted summation of a set of similarity factors between a pair of audio files connected by the edge;

determining a set of overlapping communities, wherein each community comprises a set of nodes from the plurality of nodes within the graph and each node in the graph belongs to at least one community;

determining, for each node of the plurality of nodes, a community vector comprising K number of elements for the set of overlapping communities, K being a number of communities in the set of overlapping communities, wherein an element of the K number of elements for a node of the plurality of nodes denotes whether the node belongs to a community corresponding to the element;

determining a prediction vector at a time step 'i' based on an equation $$Y^{(i)} = (\alpha m V^{(i-1)}) + ((1-\alpha) Y^{(i-1)}),$$

wherein 'α' is a predetermined scalar value, wherein 'm' is a positive scalar value if the audio file listened to by the user at a time step 'i−1' is liked by the user through the UI of the user device and a negative scalar value if the audio file is disliked by the user, and wherein '$Y^{(1)}$' is the prediction vector determined at each time step 'i' based on the community vector 'V' associated with the audio file the user listened to at the time step 'i−1'; and computing the probability distribution over the plurality of audio files based on a closeness measure between each of community vectors for the plurality of nodes and the prediction vector.

7. The method as claimed in claim 6, wherein the set of similarity factors between the pair of audio files connected by the edge is determined based on at least one of:

one or more audio features, the one or more audio features comprising a tempo, a rhythm, a loudness, and a pitch; and one or more non-audio features, the one or more non-audio features comprising one or more data points provided by the user for the plurality of audio files for a predetermined time period.

8. The method as claimed in claim 1, wherein computing a probability distribution of the one or more probability distributions comprises:

forming a directed graph comprising a plurality of nodes and a plurality of directed edges, each node representing an audio file and a directed edge from the plurality of directed edges originating from a first node to a second node representing a first audio file corresponding to the first node being played and liked before a second audio file corresponding to the second node being played and liked;

assigning a weight, with a scalar value between zero and one, to each directed edge based on a time lapse between a playback of the first audio file and a playback of the second audio file;

at a time step 'i' determining a successive score for each node to measure successiveness to an audio file corresponding to each node listened to at a preceding time step 'i−1' based on the directed graph;

at the time step 'i' computing a path score for each node based on the successive score determined at the time step 'i' and a preceding path score computed at the preceding time step 'i−1'; and computing the probability distribution over the plurality audio files based on corresponding path score associated with each audio file at the time step 'i'.

9. The method as claimed in claim 8, wherein a successive score for a node 'n' representing an audio file at a time step 'i' is determined based on an equation $$u_n^{(i)} = \sum_{p=1}^{P_n} \prod_{j=1}^{E_p} W_{(p,j)}$$

Wherein '$P_n^{(i)}$' is a total number of existing simple paths from audio files listened to at time step 'I' to the audio file corresponding to the node 'n',
wherein '$E_p$' is a total number of directed edges on a corresponding path 'p', and
wherein '$W_{(pj)}$'; represents a weight of the $j^{th}$ edge of the path 'p'.

10. The method as claimed in claim 8, wherein a path score for the node 'n' at the time step 'i' is determined based on an equation $$r_n(i) = (\alpha u_n^{(i-1)}) + ((1-\alpha) r_n^{(i-1)}),$$

wherein '$\alpha$' is a predetermined scalar value,
wherein 'u' corresponds to a succession score for the node 'n' and
wherein '$r_n$' corresponds to the path score for the node 'n' at the time step based on the succession score and a path score for the node 'n' at the preceding time step 'i−1'.

11. The method as claimed in claim 1, wherein determining the ranking comprising:
assigning weights to each of the one or more probability distributions; and
combining the one or more probability distributions based on assigned weights to form the ranking of the plurality of audio files.

12. The method as claimed in claim 1, wherein the plurality of data samples comprises listening patterns of the plurality of audio files associated with the user.

13. The method as claimed in claim 1, wherein the plurality of data samples includes information of feedback of the user on the plurality of audio files, wherein the feedback for an audio file comprises at least a like or a dislike of the audio file.

14. A processing system, comprising:
at least one processor;
a communication interface, controlled by the at least one processor, to communicate with a user device associated with a user; and
a memory having stored therein machine executable instructions, that when executed by the at least one processor, cause the processing system to:
receive, by a processing system, a plurality of data samples generated from an application in a user device of a user for a plurality of audio files, wherein the plurality of data samples comprises a plurality of contextual features associated with the user, wherein the plurality of contextual features is of interest for determining a ranking of the plurality of audio files, wherein the plurality of contextual features comprise one or more of the following: a date or a weather condition, wherein the plurality of data samples is determined at least in part from at least one change in at least one contextual feature of the plurality of contextual features of the user collected utilizing a plurality of sensing modules;
compute one or more probability distributions over the plurality of audio files based on one or more pre-defined criteria, the one or more pre-defined criteria based on the plurality of data samples, wherein the processing system is caused to compute a probability distribution of the one or more probability distributions by:
from the received plurality of data samples, collecting at least one of:
information of a time period elapsed since last playback of each audio file of the plurality of audio files,
information of a number of times each audio file is played in a pre-determined time period;
information of a number of times each audio file is liked, and
information of a number of times each audio file is disliked; and
computing probability value for each audio file of the plurality of audio files based on collected information to compute the probability distribution;
determine a ranking of the plurality of audio files based on the one or more probability distributions over the plurality of audio files;
recommend one or more audio files from the ranking of the plurality of audio files to the user through a User Interface (UI) of the user device in the application; and
play back the one or more audio files through the UI of the user device.

15. The processing system as claimed in claim 14, wherein the processing system is caused to compute a probability distribution of the one or more probability distributions by:
forming a graph comprising a plurality of nodes and a plurality of edges, each node representing an audio file and an edge of the plurality of edges representing a weighted summation of a set of similarity factors between a pair of audio files connected by the edge;
determining a set of overlapping communities, wherein each community comprises a set of nodes from the plurality of nodes within the graph and each node in the graph belongs to at least one community;
determining, for each node of the plurality of nodes, a community vector comprising K number of elements for the set of overlapping communities, K being a number of communities in the set of overlapping communities, wherein an element of the K number of elements for a node of the plurality of nodes denotes whether the node belongs to a community corresponding to the element;
determining a prediction vector comprising K number of prediction values, wherein a prediction value of the K number of prediction values represents a probability of an ideal audio file belonging to a community corresponding to the prediction value; and
computing the probability distribution over the plurality of audio files based on a closeness measure between each of community vectors for the plurality of nodes and the prediction vector.

16. The processing system as claimed in claim 14, wherein the processing system is caused to compute a probability distribution of the one or more probability distributions by:
forming a graph comprising a plurality of nodes and a plurality of edges, each node representing an audio file and an edge of the plurality of edges representing a weighted summation of a set of similarity factors between a pair of audio files connected by the edge;
determining a set of overlapping communities, wherein each community comprises a set of nodes from the plurality of nodes within the graph and each node in the graph belongs to at least one community;

determining, for each node of the plurality of nodes, a community vector comprising K number of elements for the set of overlapping communities, K being a number of communities in the set of overlapping communities, wherein an element of the K number of elements for a node of the plurality of nodes denotes whether the node belongs to a community corresponding to the element;

determining a prediction vector at a time step 'i' based on an equation $$Y^{(i)}=(\alpha m V^{(i-1)})+((1-\alpha)Y^{(i-1)}),$$

wherein '$\alpha$' is a predetermined scalar value,
wherein 'm' is a positive scalar value if the audio file listened to by the user at a time step 'i−1' is liked by the user through the UI of the user device and a negative scalar value if the audio file is disliked by the user, and
wherein '$Y^{(i)}$' is the prediction vector at each time step based on the community vector 'V' associated with the audio file the user listened to at the time step 'i−1'; and computing the probability distribution over the plurality of audio files based on a closeness measure between each of community vectors for the plurality of nodes and the prediction vector.

17. The processing system as claimed in claim 14, wherein the processing system is caused to compute a probability distribution of the one or more probability distributions by:

forming a directed graph comprising a plurality of nodes and a plurality of directed edges, each node representing an audio file and a directed edge from the plurality of directed edges originating from a first node to a second node representing a first audio file corresponding to the first node being played and liked before a second audio file corresponding to the second node being played and liked;

assigning a weight, with a scalar value between zero and one, to each directed edge based on a time lapse between a playback of the first audio file and a playback of the second audio file;

at a time step 'i', determining a successive score for each node to measure successiveness to an audio file corresponding to each node listened to at a preceding time step 'i−1' based on the directed graph;

at the time step 'i', computing a path score for each node based on the successive score determined at the time step 'i' and a preceding path score computed at the preceding time step 'i−1'; and computing the probability distribution over the plurality audio files based on corresponding path score associated with each audio file at the time step 'i'.

18. The processing system as claimed in claim 14, wherein the processing system is caused to determine the ranking by:

assigning weights to each of the one or more probability distributions; and combining the one or more probability distributions based on assigned weights to form the ranking of the plurality of audio files.

19. The processing system as claimed in claim 14, wherein the plurality of data samples comprises at least one of:

listening patterns of the plurality of audio files associated with the user; and information of feedback of the user on the plurality of audio files, wherein the feedback for an audio file comprises at least a like or a dislike of the audio file.

20. A computer program product comprising at least one computer-readable storage medium, the computer-readable storage medium comprising a set of instructions which, when executed by one or more processors, cause a processing system to:

receive, by a processing system, a plurality of data samples generated from an application in a user device of a user for a plurality of audio files, wherein the plurality of data samples comprises a plurality of contextual features associated with the user, wherein the plurality of contextual features is of interest for determining a ranking of the plurality of audio files, wherein the plurality of contextual features comprise one or more of the following: a date or a weather condition, wherein the plurality of data samples is determined at least in part from at least one change in at least one contextual feature of the plurality of contextual features of the user collected utilizing a plurality of sensing modules;

compute one or more probability distributions over the plurality of audio files based on one or more pre-defined criteria, the one or more pre-defined criteria based on the plurality of data samples, wherein the processing system is caused to compute a probability distribution of the one or more probability distributions by:

from the received plurality of data samples, collecting at least one of:

information of a time period elapsed since last playback of each audio file of the plurality of audio files, information of a number of times each audio file is played in a pre-determined time period;

information of a number of times each audio file is liked, and information of a number of times each audio file is disliked; and computing probability value for each audio file of the plurality of audio files based on collected information to compute the probability distribution;

determine a ranking of the plurality of audio files based on the one or more probability distributions over the plurality of audio files;

recommend one or more audio files from the ranking of the plurality of audio files to a user through a User Interface (UI) of the user device in the application; and play back the one or more audio files through the UI of the user device.

* * * * *